US009864747B2

(12) United States Patent
Kamimaeda et al.

(10) Patent No.: US 9,864,747 B2
(45) Date of Patent: Jan. 9, 2018

(54) CONTENT RECOMMENDATION DEVICE, RECOMMENDED CONTENT SEARCH METHOD, AND PROGRAM

(75) Inventors: Naoki Kamimaeda, Kanagawa (JP); Masanori Miyahara, Tokyo (JP); Tomohiro Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 13/427,292

(22) Filed: Mar. 22, 2012

(65) Prior Publication Data
US 2012/0254310 A1  Oct. 4, 2012

(30) Foreign Application Priority Data

Mar. 29, 2011  (JP) ................................ 2011-072324

(51) Int. Cl.
*G06F 15/16*   (2006.01)
*G06F 17/30*   (2006.01)

(52) U.S. Cl.
CPC ........ *G06F 17/30035* (2013.01); *G06F 17/30* (2013.01)

(58) Field of Classification Search
None
See application file for complete search history.

(56) References Cited

U.S. PATENT DOCUMENTS

| 7,949,565 | B1 * | 5/2011 | Eldering | G06Q 30/02 705/14.49 |
| 2003/0005025 | A1 * | 1/2003 | Shavit | G06F 9/4843 718/102 |
| 2003/0182274 | A1 * | 9/2003 | Oh | G06F 17/30873 |
| 2004/0109668 | A1 * | 6/2004 | Stuckman | H04N 5/782 386/295 |
| 2004/0117448 | A1 * | 6/2004 | Newman | G06F 17/30707 709/206 |
| 2004/0117831 | A1 * | 6/2004 | Ellis | H04N 5/44543 725/53 |
| 2005/0257242 | A1 * | 11/2005 | Montgomery | G11B 27/034 725/116 |
| 2008/0195664 | A1 * | 8/2008 | Maharajh | G06F 17/30035 |
| 2008/0294607 | A1 * | 11/2008 | Partovi | G06Q 30/00 |

(Continued)

FOREIGN PATENT DOCUMENTS

JP  2003-167901  6/2003

OTHER PUBLICATIONS

Dedre Centner, "Structure-Mapping: A Theoretical Framework for Analogy", Cognitive Science, 1983, 16 pages.

*Primary Examiner* — Viet Vu
*Assistant Examiner* — James Edwards
(74) *Attorney, Agent, or Firm* — Chip Law Group

(57) ABSTRACT

There is provided a device that generates a first feature based on information of a first type included in first content selected by a target user in past, generates a second feature based on information of a second type included in second content selected by the target user after selecting the first contest, generates a relational feature showing a relationship between the first content and the second content, based on the first feature and the second feature, and searches for content to be recommended to the target user by using the information of the first type included in content newly selected by the target user and the relational feature.

13 Claims, 38 Drawing Sheets

(56) References Cited

U.S. PATENT DOCUMENTS

| | | | |
|---|---|---|---|
| 2009/0150786 A1* | 6/2009 | Brown | G06F 17/30035 715/733 |
| 2010/0076847 A1* | 3/2010 | Heller | G06Q 30/0255 705/14.53 |
| 2010/0114696 A1* | 5/2010 | Yang | G06Q 30/02 705/14.49 |
| 2010/0138428 A1* | 6/2010 | Uchino | G06F 17/30864 707/751 |
| 2011/0258042 A1* | 10/2011 | Purvy | G06Q 30/02 705/14.49 |
| 2011/0264522 A1* | 10/2011 | Chan | G06Q 30/02 705/14.52 |
| 2012/0005045 A1* | 1/2012 | Baker | G06Q 30/0643 705/27.2 |
| 2012/0066235 A1* | 3/2012 | Itakura | G06F 17/30035 707/751 |
| 2012/0215903 A1* | 8/2012 | Fleischman | G06Q 30/0201 709/224 |
| 2014/0316903 A1* | 10/2014 | Maharajh | G06F 17/30035 705/14.66 |

* cited by examiner (FLOW OF PROCESSING OF FOUR-TERM ANALOGY)

FIG.6

(STRUCTURE OF CONTENT FEATURE DB)

| ITEM ID | AREA ID | FEATURE ID | NUMBER OF UPDATES | IMPORTANCE |
|---------|---------|------------|-------------------|------------|
| 0001 | 1 | 2 | 10 | 1.58 |
| 0002 | 1 | 30 | 21 | 1.12 |
| 0003 | 2 | 52 | 2 | 2.11 |
| 0004 | 11 | 4 | 8 | 1.01 |
| ⋮ | ⋮ | ⋮ | ⋮ | ⋮ |

FIG.7

(STRUCTURE OF USER PREFERENCE DB)

| USER ID | AREA ID | FEATURE ID | IMPORTANCE |
|---------|---------|------------|------------|
| 1 | 1 | 30 | 0.5 |
| 1 | 2 | 2 | 0.3 |
| 1 | 2 | 4 | 1.3 |
| 1 | 11 | 52 | 12.4 |
| 2 | 1 | 3 | 0.9 |
| 2 | 2 | 4 | 1.2 |
| 2 | 5 | 65 | 3.2 |
| 2 | 6 | 3 | 0.9 |
| ⋮ | ⋮ | ⋮ | ⋮ |

FIG.8

(STRUCTURE OF CASE DB)

| WORD VECTOR OF SITUATION A | | WORD VECTOR OF RESULT B | | RELATIONSHIP R |
|---|---|---|---|---|
| word A1 | word A2 | word B1 | word B2 | word R |
| 1 | 5 | 2 | 1 | 8 |
| 1 | 5 | 2 | 1 | 3 |
| 1 | 5 | 2 | 1 | 10 |
| 1 | 5 | 2 | 1 | 15 |
| 1 | 5 | 2 | 7 | 4 |
| 1 | 5 | 2 | 7 | 23 |
| 1 | 5 | 2 | 7 | 4 |
| 1 | 6 | 1 | 5 | 2 |
| 1 | 6 | 1 | 5 | 1 |
| 1 | 6 | 1 | 5 | 7 |

FIG.20

(STRUCTURE OF CENTRE DB)

| CLUSTER ID | CENTRE WORD ID |
|---|---|
| 1 | 8 |
| 1 | 3 |
| 1 | 10 |
| 2 | 15 |
| 2 | 2 |
| ⋮ | ⋮ |

FIG.21

(STRUCTURE OF R PATTERN DB)

| CLUSTER ID | WORD VECTOR OF SITUATION A | | WORD VECTOR OF RESULT B | | RELATIONSHIP R |
|---|---|---|---|---|---|
| | word A1 | word A2 | word B1 | word B2 | word R |
| 1 | 1 | 5 | 2 | 1 | 8 |
| 1 | 1 | 5 | 2 | 1 | 3 |
| 1 | 1 | 5 | 2 | 1 | 10 |
| 1 | 1 | 5 | 2 | 1 | 15 |
| 2 | 1 | 5 | 2 | 7 | 4 |
| 2 | 1 | 5 | 2 | 7 | 23 |
| 2 | 1 | 6 | 1 | 7 | 4 |
| 2 | 1 | 6 | 1 | 5 | 2 |
| 1 | 1 | 6 | 1 | 5 | 1 |
| 1 | 1 | 6 | 1 | 5 | 7 |

FIG.31

(STRUCTURE OF RECOMMENDATION LIST DB)

| WORD VECTOR OF SITUATION C | | ITEM ID | SCORE |
|---|---|---|---|
| word C1 | word C2 | | |
| 704 | 706 | 81925 | 0.12 |
| 704 | 706 | 99623 | 0.20 |
| 704 | 706 | 11245 | 0.18 |
| 4315 | 4369 | 21907 | 0.83 |
| 4315 | 4660 | 28 | 0.62 |
| 4315 | 4660 | 1397 | 0.11 |
| 2794 | 2796 | 11287 | 0.01 |
| 4762 | 4806 | 45902 | 0.91 |
| 6110 | 6997 | 7239 | 1.12 |
| ⋮ | ⋮ | ⋮ | ⋮ |

FIG.33

(OFFLINE PROCESS)

(1) EXTRACT WORDS

C'

Rmerge (2) SEARCH re1', re2', ... re8'

(3) CREATE RECOMMENDATION LIST

< RECOMMENDATION LIST >
1: re1'  0.3
2: re2'  0.2
3: re3'  0.13
⋮

CONTENT RECOMMENDATION DEVICE, RECOMMENDED CONTENT SEARCH METHOD, AND PROGRAM

BACKGROUND

The present technology relates to a content recommendation device, a recommended content search method and a program.

In recent years, businesses using networks are growing fast. For example, systems such as online stores and the like where products can be purchased online are widely used. Many of these online stores use a mechanism of recommending products to users. For example, when a user views detailed information of a product, information on products related to the product is presented to the user as recommended products.

Such a mechanism is realized by using a method such as collaborative filtering described in JP 2003-167901A, for example. This collaborative filtering is a method of automatically giving recommendation by using information of a user with similar preference, based on preference information of many users. When using this collaborative filtering, a recommendation result can be provided also to a new user with no purchase history.

Furthermore, a method called content-based filtering may also be used for recommendation of a product. This content-based filtering is a method of matching an attribute of content and the taste of a user and thereby recommending related content. According to this content-based filtering, a highly accurate recommendation result can be provided, compared to collaborative filtering, even in a situation where the number of users using a recommendation system is small. However, in a situation where information for identifying content that a target user likes (for example, a purchase history, content meta-information or the like) is scarce, it is difficult to obtain a highly accurate recommendation result using content-based filtering.

SUMMARY

Collaborative filtering and content-based filtering both have their advantages and disadvantages. For example, content-based filtering has an advantage that recommendation reflecting the preference of a user can be realized. On the other hand, content-based filtering has a disadvantage that it gives rise to a situation where only specific types of information that suit the preference of the user are recommended and information that is new to the user is not recommended. For its part, collaborative filtering has an advantage that new information preferred by another user can be provided to a user. However, the new information preferred by another user may not suit the preference of a user to whom recommendation is to be made. That is, collaborative filtering has a disadvantage that there is a possibility that information not suiting the preference of a user is provided to the user.

The present technology has been developed in view of the above circumstances, and intends to provide a content recommendation device, a recommended content search method, and a program which are novel and improved, and which are capable of providing a user with content including new information that would suit the preference of the user.

According to an embodiment of the present technology, there is provided a content recommendation device which includes a first feature generation unit for generating a first feature based on information of a first type included in first content selected by a target user in past, a second feature generation unit for generating a second feature based on information of a second type included in second content selected by the target user after selecting the first contest, a relational feature generation unit for generating a relational feature showing a relationship between the first content and the second content, based on the first feature generated by the first feature generation unit and the second feature generated by the second feature generation unit, and a recommended content search unit for searching for content to be recommended to the target user by using the information of the first type included in content newly selected by the target user and the relational feature generated by the relational feature generation unit.

The recommended content search unit may search for the content to be recommended to the target user by performing a first process of extracting a first feature corresponding to the information of the first type included in the content newly selected by the target user from first features generated by the first feature generation unit, performing a second process of extracting a relational feature corresponding to the first feature extracted by the first process, from relational features generated by the relational feature generation unit, and using the relational feature extracted by the second process.

The first feature may be expressed by a first feature vector that includes a plurality of information elements forming the information of the first type and that characterizes the first content. The second feature may be expressed by a second feature vector that includes a plurality of information elements forming the information of the second type and that characterizes the second content.

The first feature generation unit may generate the first feature taking into consideration an order that the target user selected the first content.

The first feature generation unit may acquire, by referring to a structure of metadata of the first content, information from an area to which metadata corresponding to the first type is added. The second feature generation unit may acquire, by referring to a structure of metadata of the second content, information from an area to which metadata corresponding to the second type is added.

The content recommendation device may further include a relationship selection request unit for presenting to the target user more than one of the relational feature generated by the relational feature generation unit and causing the target user to select a relational feature. In a case a relational feature is selected by the target user, the recommended content search unit searches for the content to be recommended to the target user by using the relational feature selected by the target user.

The recommended content search unit may search for the content to be recommended to the target user by calculating a score according to a strength of the relationship between the first content and the second content and taking the calculated score into consideration.

The first feature generation unit may generate the first feature before the target user newly selects content. The second feature generation unit may generate the second feature before the target user newly selects content. The relational feature generation unit may generate the relational feature before the target user newly selects content.

Before the target user newly selects content, the recommended content search unit may perform, by using predetermined information corresponding to the information of the first type, a first process of extracting the first feature corresponding to the predetermined information, performs a second process of extracting a relational feature corresponding to the first feature extracted by the first process, from relational features generated by the relational feature generation unit, and performs a third process of calculating a score of the relational feature extracted by the second process. In a case the target user newly selected content, the recommended content search unit may perform a fourth process of extracting the predetermined information corresponding to the information of the first type included in the content newly selected by the target user, and searches for content to be recommended to the target user, based on a score of a relational feature corresponding to the predetermined information extracted by the fourth process.

A category to which the first content and the second content belong and a category to which the content newly selected by the target user belongs may be different categories.

According to another embodiment of the present technology, there is provided a content recommendation device which includes a feature storage unit storing a first feature generated based on information of a first type included in first content selected by a target user in past, a second feature generated based on information of a second type included in second content selected by the target user after selecting the first content, and a third feature, generated based the first feature which was generated and the second feature which was generated, showing a relationship between the first content and the second content, and a recommended content search unit for searching for content to be recommended to the target user by using the information of the first type included in content newly selected by the target user and the third feature stored in the feature storage unit.

According to another embodiment of the present technology, there is provided a recommended content search method which includes generating a first feature based on information of a first type included in first content selected by a target user in past, generating a second feature based on information of a second type included in second content selected by the target user after selecting the first contest, generating a relational feature showing a relationship between the first content and the second content, based on the first feature generated in the step of generating a first feature and the second feature generated in the step of generating a second feature, and searching for content to be recommended to the target user by using the information of the first type included in content newly selected by the target user and the relational feature generated in the step of generating a relational feature.

According to another embodiment of the present technology, there is provided a program for causing a computer to realize a first feature generation function of generating a first feature based on information of a first type included in first content selected by a target user in past, a second feature generation function of generating a second feature based on information of a second type included in second content selected by the target user after selecting the first contest, a relational feature generation function of generating a relational feature showing a relationship between the first content and the second content, based on the first feature generated by the first feature generation function and the second feature generated by the second feature generation function, and a recommended content search function of searching for content to be recommended to the target user by using the information of the first type included in content newly selected by the target user and the relational feature generated by the relational feature generation function.

According to another embodiment of the present technology, there is provided a computer-readable recording medium in which the program is recorded.

According to the embodiments of the present technology described above, it is possible to provide a user with content including new information that would suit the preference of the user.

BRIEF DESCRIPTION OF THE DRAWINGS

FIG. 6 is an explanatory diagram for describing a structure of a content feature database according to the first embodiment of the present technology;

FIG. 7 is an explanatory diagram for describing a structure of a user preference database according to the first embodiment of the present technology;

FIG. 8 is an explanatory diagram for describing a structure of a case database according to the first embodiment of the present technology;

FIG. 20 is an explanatory diagram for describing a structure of a centre database according to the second embodiment of the present technology;

FIG. 21 is an explanatory diagram for describing a structure of an R pattern database according to the second embodiment of the present technology;

FIG. 31 is an explanatory diagram for describing a structure of a recommendation list database according to the third embodiment of the present technology;

FIG. 33 is an explanatory diagram for describing the offline process (score calculation for relationship R) according to the third embodiment of the present technology;

DETAILED DESCRIPTION OF THE EMBODIMENT(S)

Figure 1:
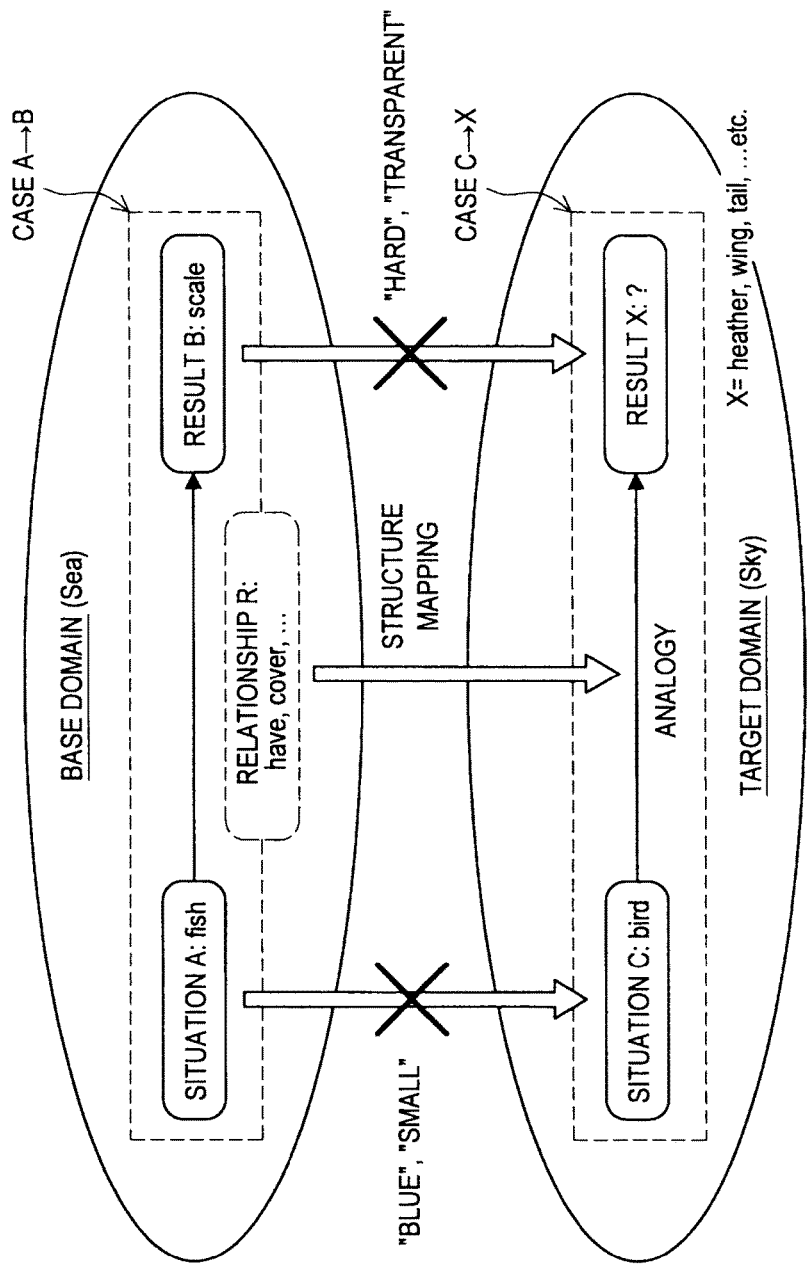
FIG. 1 is an explanatory diagram for describing a concept of a four-term analogy.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of Explanation]

The flow of the explanation described below will be briefly stated here.

First, a concept of a four-term analogy used for the technology according to an embodiment described below will be described. First, a concept of the four-term analogy will be described with reference to FIG. 1. Then, a flow of processing related to the four-term analogy will be described with reference to FIG. 2. Next, an overview of a multi-dimensionalised four-term analogy will be described with reference to FIG. 3. Further, a structure of content metadata used at the time of applying the four-term analogy to a specific case will be described with reference to FIG. 4.

Next, a first embodiment of the present technology will be described. First, a configuration of a recommendation system 100 according to the first embodiment of the present technology will be described with reference to FIG. 5. Also, a structure of a content feature database 104 according to the first embodiment of the present technology will be described with reference to FIG. 6. Furthermore, a structure of a user preference database 102 according to the first embodiment of the present technology will be described with reference to FIG. 7. Then, a structure of a case database 106 according to the first embodiment of the present technology and a creation method thereof will be described with reference to FIGS. 8 to 12. Next, a recommendation process according to the first embodiment of the present technology will be described with reference to FIGS. 13 to 18. Herein, an explanation will be given also on a process of preference learning according to the first embodiment of the present technology.

Next, a second embodiment of the present technology will be described. First, a configuration of a recommendation system 200 according to the second embodiment of the present technology will be described with reference to FIG. 19. Next, a structure of a centre database (R pattern database 209) according to the second embodiment of the present technology will be described with reference to FIG. 20. Furthermore, a structure of the R pattern database 209 according to the second embodiment of the present technology will be described with reference to FIG. 21. Then, a recommendation process according to the second embodiment of the present embodiment will be described with reference to FIGS. 22 to 29. Herein, an explanation will be given also on a clustering process and selection of an R pattern according to the second embodiment of the present technology.

Next, a third embodiment of the present technology will be described. First, a configuration of a recommendation system 300 according to the third embodiment of the present technology will be described with reference to FIG. 30. Also, a structure of a recommendation list database 309 according to the third embodiment of the present technology will be described with reference to FIG. 31. Then, an offline process according to the third embodiment of the present technology will be described with reference to FIGS. 31 to 34. Next, an online process according to the third embodiment of the present technology will be described with reference to FIGS. 35 and 36. Next, an example application (cross-category recommendation) of the technologies according to the first to third embodiments of the present technology will be described with reference to FIG. 37. Then, a hardware configuration capable of realizing the functions of the recommendation systems according to the first to third embodiments of the present technology will be described with reference to FIG. 38.

Lastly, technical ideas of the embodiment will be summarized and effects obtained by the technical ideas will be briefly described.

(Description Items)
1: Introduction
1-1: Four-Term Analogy
1-2: Multi-Dimensionalisation of Four-Term Analogy
2: First Embodiment
2-1: System Configuration
2-2: Flow of Offline Process
2-3: Flow of Online Process
3: Second Embodiment
3-1: System Configuration
3-2: Flow of Offline Process
3-3: Flow of Online Process
4: Third Embodiment
4-1: System Configuration
4-2: Flow of Offline Process
4-3: Flow of Online Process
5: Example Application (Cross-Category Recommendation)
6: Example Hardware Configuration
7: Summary 1: Introduction First, before describing technologies according to the present embodiments in detail, the concept of a four-term analogy and an overview of the present embodiments will be briefly described.

[1-1: Four-Term Analogy]

First, the concept of a four-term analogy will be described with reference to FIG. 1. FIG. 1 is an explanatory diagram for describing the concept of a four-term analogy.

A four-term analogy is a process, which has been modeled, of a person inferring a thing by analogy based on prior knowledge. When information C is given to a person having "case: A→B" as prior knowledge, what kind of information X does the person infer from information C by analogy? For example, when a word "fish" is given as A and a word "scale" is given as B, a person may think of a concept expressed by a word "have," a word "cover" or the like as a relationship R between A and B. Then, when a word "bird" is given to this person as information C and the person is made to infer information X by analogy based on the relationship R, it is assumed that the person infers by analogy a word "feather," a word "wing" or the like. The four-term analogy is obtained by modeling such an inference process of a person.

As this four-term analogy, a technology of estimating a solution X of "case: C→X" that is inferred by analogy by a person provided with "case: A→B" as prior knowledge is gaining attention. Additionally, in the following, the process of inferring "case: C→X" from "case: A→B" by analogy may be expressed as "A:B=C:X." As the technology of estimating a solution X of "A:B=C:X," an estimation method called a structure-mapping theory is known, for example. According to this estimation method, a solution X (hereinafter, a result X) is estimated, as shown in FIG. 1, by applying a relationship R between A (hereinafter, a situation A) and B (hereinafter, a result B) of "case: A→B" to C (hereinafter, a situation C) of "case: C→X."

That is, the structure-mapping theory described above may also be said as a method of mapping the structure of a knowledge domain constructing the prior knowledge (hereinafter, a base domain) onto a domain of a problem of obtaining a solution X (hereinafter, a target domain). The structure-mapping theory is described, for example, in D. Gentner, "Structure-Mapping: A Theoretical Framework for Analogy", Cognitive Science, 1983.

When using the structure-mapping theory described above, useless knowledge arising at the time of mapping the structure of the base domain can be eliminated, and an inferred result X which is adequate to a certain degree can be obtained. For example, in a case a word "fish" is given as a situation A, as shown in FIG. 1, knowledge such as "blue," "small" and the like that are inferred by analogy from the word "fish" can be eliminated at the time of estimation of a result X. Similarly, in a case a word "scale" is given as a result B, knowledge such as "hard," "transparent" and the like can be eliminated at the time of estimation of a result X.

Figure 2:
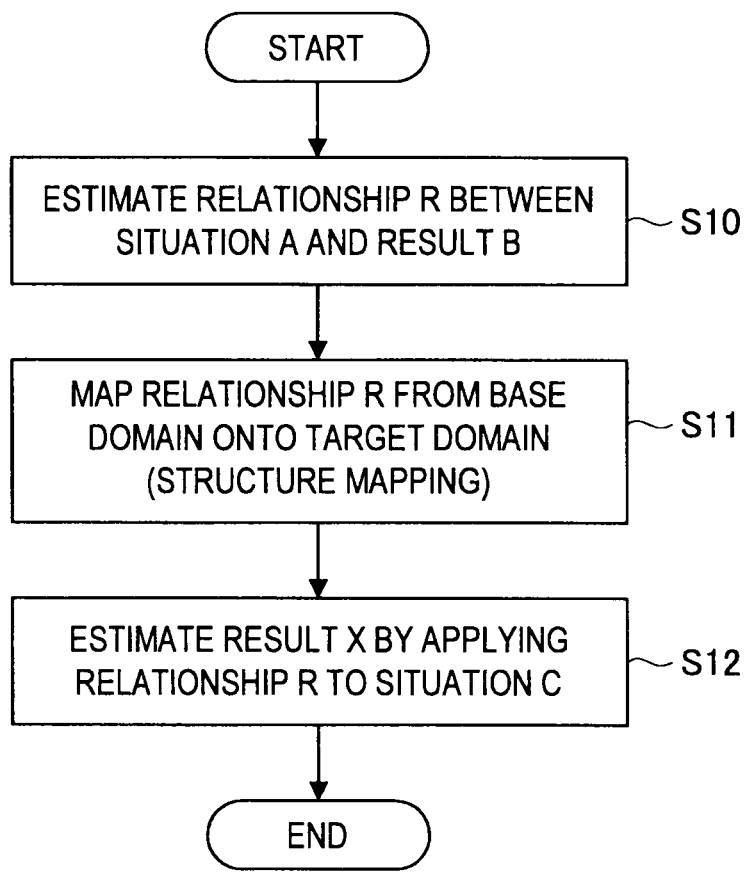
FIG. 2 is an explanatory diagram for describing a flow of processing related to the four-term analogy.

An estimation process of a result X based on the structure-mapping theory is performed by processing steps shown in FIG. 2, for example. First, as shown in FIG. 2, a process of estimating a relationship R between a situation A and a result B is performed (S10). Then, a process of mapping the relationship R estimated in step S10 from a base domain onto a target domain is performed (S11). Next, a process of applying the relationship R to a situation C and estimating a result X is performed (S12). With the processes of these steps S10 to S12 performed, a solution X of "case: C→X" is estimated based on "case: A→B."

Heretofore, a concept of the four-term analogy has been described. Systemisation of the concept of the four-term analogy described above from the viewpoint of a fuzzy theory is being studied by Kaneko et al., and the research results are reported. For example, such reports include Yosuke Kaneko, Kazuhiro Okada, Shinichiro Ito, Takuya Nomura and Tomihiro Takagi, "A Proposal of Analogical Reasoning Based on Structural Mapping and Image Schemas", 5th International Conference on Soft Computing and Intelligent Systems and 11th International Symposium on Advanced Intelligent Systems (SCIS & ISIS 10), 2010. In these reports, Kaneko et al. propose a recommendation system that extracts a relationship R, which is to be mapped, from a co-occurrence frequency of a word, and that uses part-of-speech information of the word as a structure. This report would help understand the concept of the four-term analogy.

[1-2: Multi-Dimensionalisation of Four-Term Analogy]

Figure 3:
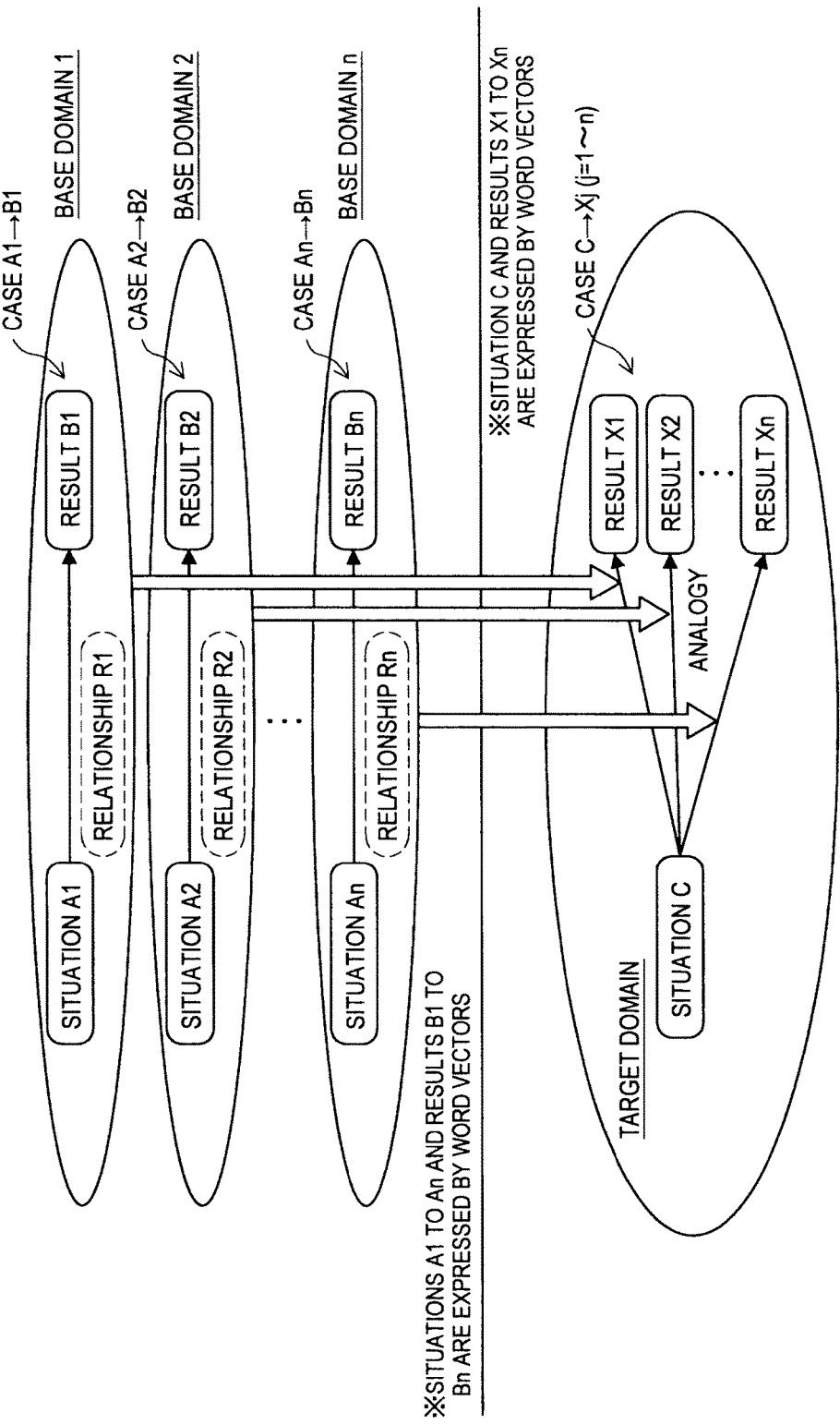
FIG. 3 is an explanatory diagram for describing an overview of a multi-dimensionalised four-term analogy.

Next, a method of multi-dimensionalising the four-term analogy will be described with reference to FIG. 3. FIG. 3 is an explanatory diagram for describing a method of multi-dimensionalising the four-term analogy. Additionally, as a research result related to multi-dimensionalisation of the four-term analogy, there is a method described in Japan Patent Application No. 2011-18787.

The example of FIG. 1 was related to structure mapping from one base domain onto one target domain. Also, in the example of FIG. 1, the situation A, the result B, the situation C and the result X were expressed by one word, respectively. The concept of the four-term analogy is expanded here, and a new method of mapping structures from a plurality of base domains onto one target domain, as shown in FIG. 3, will be considered. Also, a method of expressing each of the situation A, the result B, the situation C and the result X by a word vector formed by one or more words will be considered. Additionally, the new method to be considered here will be referred to as a "multi-dimensional four-term analogy." In the following, a concept of the multi-dimensional four-term analogy will be described.

As shown in FIG. 3, n base domains (base domain 1 to base domain n) are assumed. Also, it is assumed that "case: Ak→Bk" belongs to a base domain k (k=1 to n). Furthermore, it is assumed that a situation Ak and a result Bk are expressed by word vectors including a plurality of words. Also, it is assumed that the structures of the base domain 1 to the base domain n are to be mapped onto one target domain. Furthermore, it is assumed that "case: C→Xj (j=1 to n)" belongs to this target domain. Additionally, a relationship Rk between the situation Ak and the result Bk is used for estimation of a result Xk of "case: C→Xk."

For example, the situation Ak (k=1 to n) is expressed by a word vector characterizing preference of a person (hereinafter, a target user) extracted from a group of pieces of content that the target user has selected in the past. Also, the result Bk (k=1 to n) is based on the situation Ak, and is expressed by a word vector characterizing content that the target user selected after the group of pieces of content. Furthermore, the relationship Rk (k=1 to n) is expressed by a word vector characterizing the relationship between the situation Ak and the result Bk. Furthermore, the situation C is expressed by a word vector characterizing preference of the target user extracted from the group of pieces of content including content newly selected by the target user. Also, the result Xk (k=1 to n) is a word vector characterizing content that is inferred by analogy based on the word vector of the situation C and the word vector of the relationship R.

That is, a result X1 is inferred by analogy using a relationship R1 between a situation A1 and a result B1, and the situation C. Likewise, a result X2 is inferred by analogy from a relationship R2 and the situation C, a result X3 is inferred by analogy from a relationship R3 and the situation C, . . . , and a result Xn is inferred by analogy from a relationship Rn and the situation C. Additionally, each word vector is created using an algorithm called TF-IDF, for example. This TF-IDF is an algorithm for extracting a characteristic word from a document. The TF-IDF outputs an index called a TF-IDF value. This TF-IDF value is expressed by product of a TF value indicating a term frequency of a word and an IDF value indicating an inverse document frequency.

For example, where Nj is the term frequency of a word j in a document d, N is the total number of words included in the document d and Dj is the number of documents in which the word j appears, a TF value tf(j, d) is expressed by Formula (1) below. Also, an IDF value idf(j) is expressed by Formula (2) below. Further, a TF-IDF value tfidf(j, d) is expressed by Formula (3) below. That is, the TF-IDF value of a word appearing in many documents decreases, and the TF-IDF value of a word appearing frequently in a specific document increases. Thus, by using this index, a word characterizing each document can be extracted. Also, by extracting a plurality of words with high TF-IDF values, a word vector characterizing a document is created.

$$tf(j,d)=Nj/N \quad (1)$$

$$idf(j)=1+\ln(D/Dj) \quad (2)$$

$$tfidf(j,d)=tf(j,d)\cdot idf(j) \quad (3)$$

Here, an example embodiment using a recipe website as an information source will be considered. Many recipe websites are configured in such a way as to allow users to freely post recipes of dishes that the users have cooked. Also, such recipe websites are configured in such a way as to allow other users who have viewed the recipe websites to post comments. Of course, as with other information websites, the recipe websites are provided with sections such as titles, images and explanations. Also, some recipe websites are provided with sections such as ingredients, cooking instructions, cooking tips, recipe histories and registered categories. These sections are defined by metadata.

Figure 4:
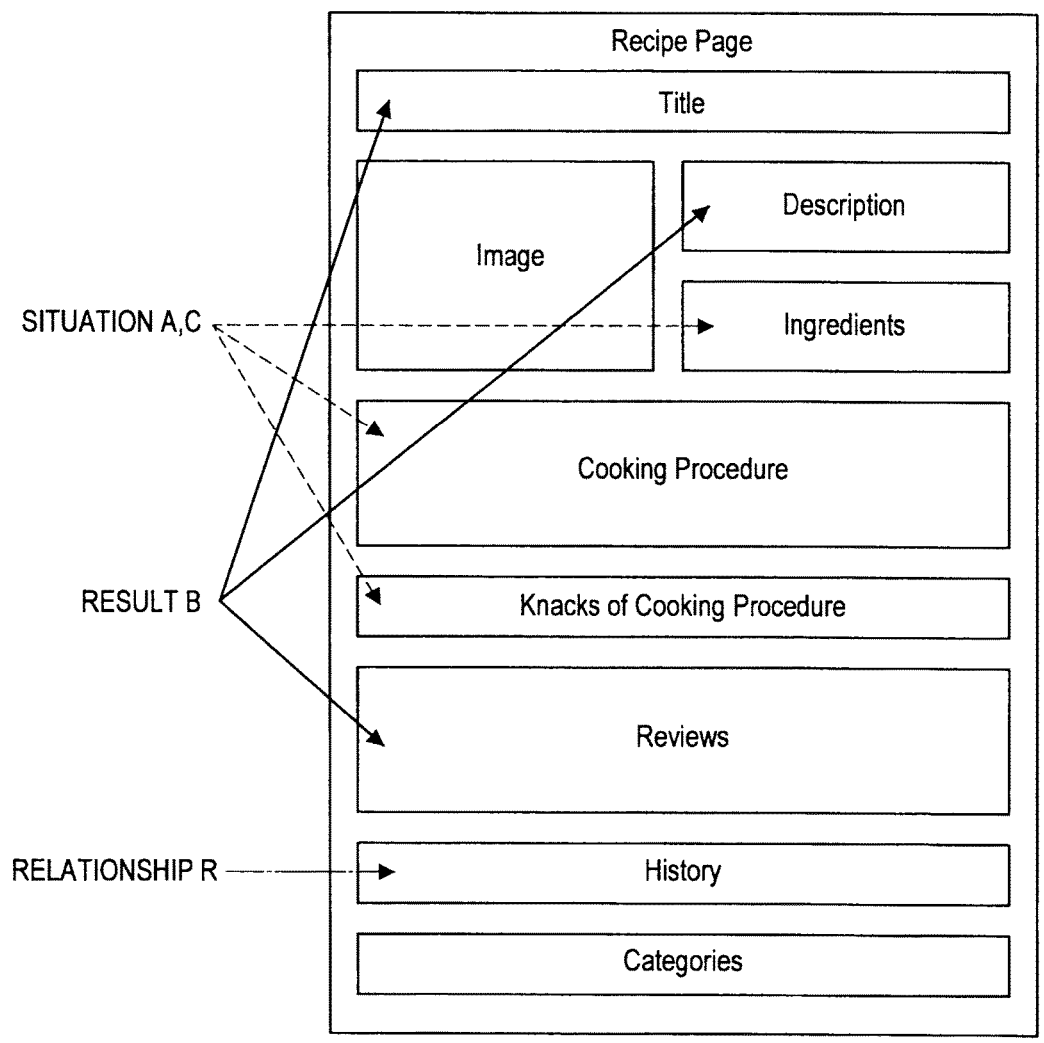
FIG. 4 is an explanatory diagram for describing a structure of content metadata.

For example, as shown in FIG. 4, a recipe website has its structure defined by metadata of Title, Image, Description, Ingredients, Cooking Procedure, Knacks of Cooking Procedure, Reviews, History, Categories, and the like. Among these, the sections of Title, Description, Ingredients, Cooking Procedure, Knacks of Cooking Procedure, Reviews, and History include information that can be used for the multi-dimensional four-term analogy.

For example, as shown in FIG. 4, the sections of Ingredients, Cooking Procedure, and Knacks of Cooking Procedure can be used as information sources related to the situation A and the situation C. Also, the sections of Title, Description, and Reviews can be used as an information source related to the result B. Furthermore, the section of History can be used as an information source related to the relationship R.

That is, the information sources related to the situation A and the situation C are set in areas indicating preference (in this example, ingredients, cooking instructions, cooking tips and the like) of a user. On the other hand, the information source related to the result B is set in areas where results of actually tasting the food described in the recipe website and the like are expressed. Furthermore, the information source related to the relationship R is set in an area where the relationship between the situation A and the result B (in this example, the background leading to the recipe posted on the recipe website and the like) is expressed. As described, by using the structure of metadata, the information sources related to the situation A, the result B, the situation C and the relationship R can be easily set. Also, a word vector corresponding to the situation A, the result B or the situation C can be created from the document described in an area by using the TF-IDF value or the like described above.

An example embodiment that uses a recipe website as an information source has been considered, but the information sources related to the situation A, the result B, the situation C and the relationship R can be set by referring to the structure of metadata also with respect to other types of websites. Additionally, an information source related to the result X is set in an area to which the same metadata as the information source related to the result B is attached. When the information source is set in this manner, results X1 to Xn can be estimated based on the multi-dimensional four-term analogy as shown in FIG. 3 using word vectors extracted from the history of websites visited by a user or the like.

The technology according to the present embodiment relates to the estimation described above. However, the technology according to the present embodiment does not focus on the estimation of results X1 to Xn based on the multi-dimensional four-term analogy, and is related to a technology of searching for recommended content suiting the preference of a user by using relationships R1 to Rn. Also, the application scope of the present embodiment is not limited to recipe websites, and can be applied to various types of content.

In the foregoing, the concept of the four-term analogy and the overview of the present embodiment have been briefly described. In the following, the technology according to the present embodiment will be described in detail.

2: First Embodiment

A first embodiment of the present technology will be described.

[2-1: System Configuration]

Figure 5:
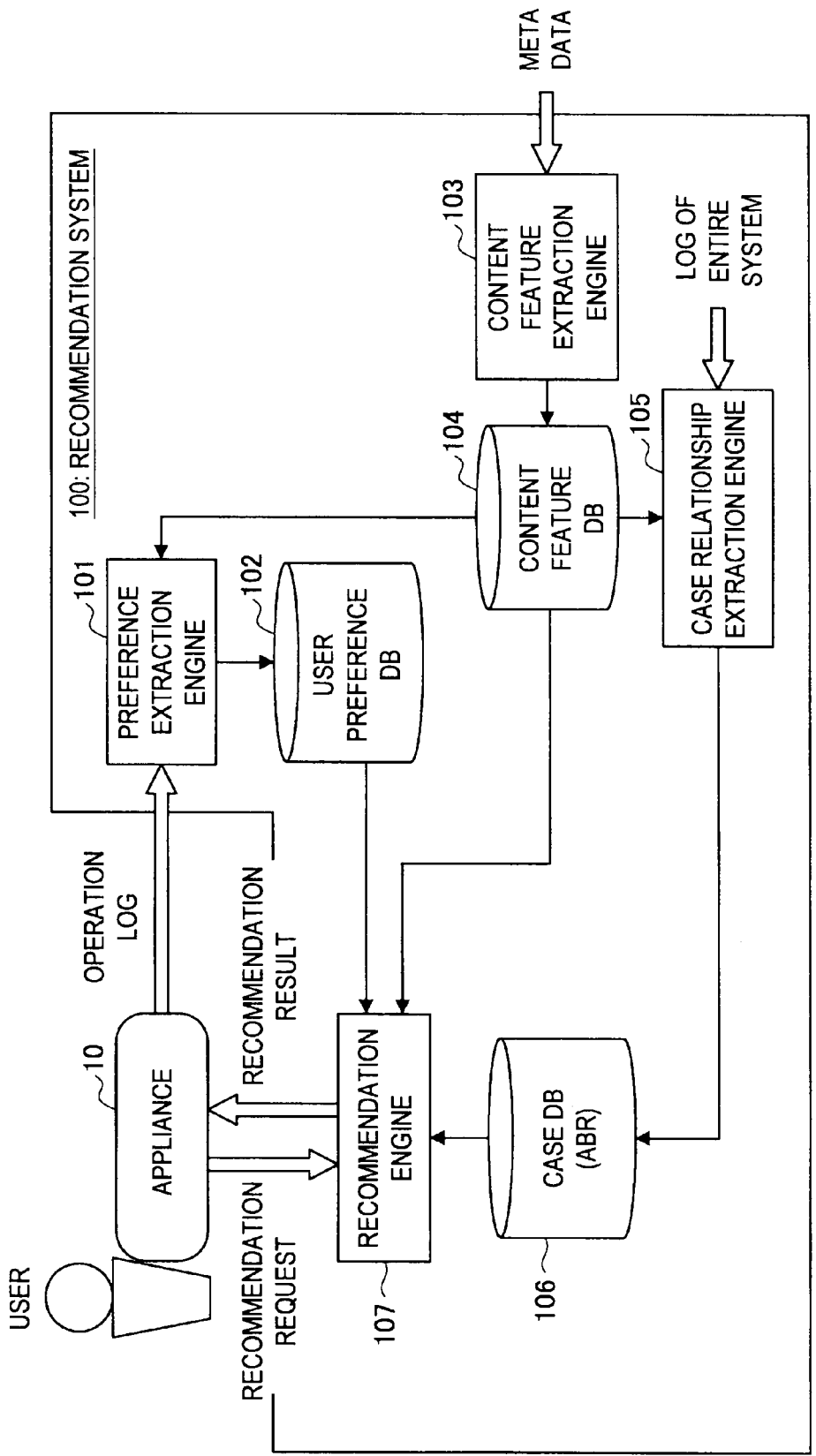
FIG. 5 is an explanatory diagram for describing a configuration of a recommendation system according to a first embodiment of the present technology.

First, a system configuration of a recommendation system 100 according to the present embodiment will be described with reference to FIG. 5. FIG. 5 is an explanatory diagram for describing a system configuration of the recommendation system 100 according to the present embodiment.

As shown in FIG. 5, the recommendation system 100 is configured mainly from a preference extraction engine 101, a user preference database 102, a content feature extraction engine 103, a content feature database 104, a case relationship extraction engine 105, a case database 106 and a recommendation engine 107.

Figure 38:
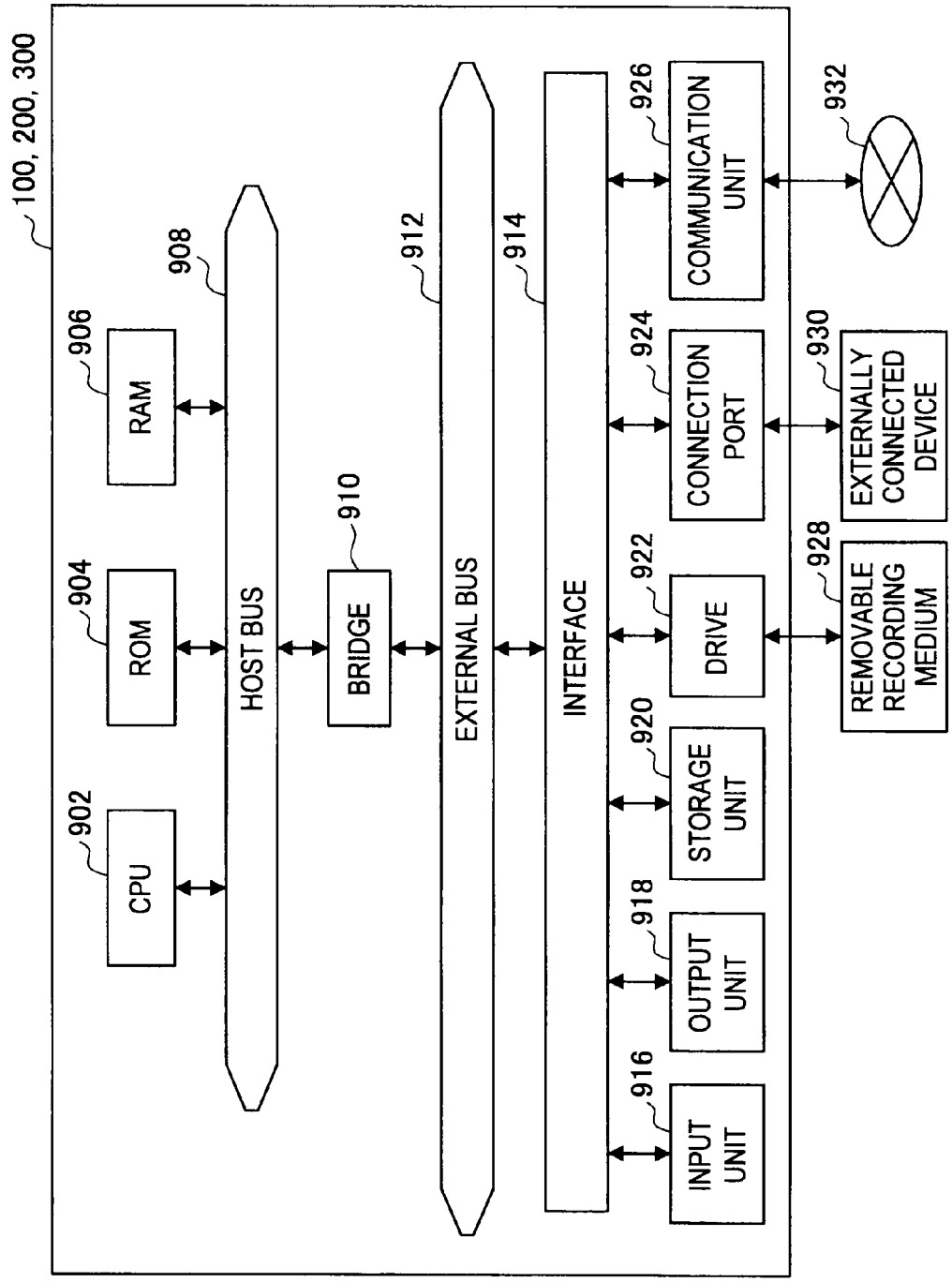
FIG. 38 is an explanatory diagram for describing a hardware configuration capable of realizing the functions of the recommendation systems according to the first to third embodiments of the present technology.

Additionally, the functions of the preference extraction engine 101, the content feature extraction engine 103, the case relationship extraction engine 105 and the recommendation engine 107 are realized by the functions of a CPU 902 or the like among the hardware configuration shown in FIG. 38. Also, the user preference database 102, the content feature database 104 and the case database 106 are realized by the functions of a ROM 904, a RAM 906, a storage unit 920, a removable recording medium 928 and the like among the hardware configuration shown in FIG. 38. Furthermore, the function of the recommendation system 100 may be realized using a single piece of hardware or a plurality of pieces of hardware connected via a network or a leased line.

(Content Feature Extraction Engine 103, Content Feature Database 104)

First, the content feature extraction engine 103 and the content feature database 104 will be described.

The content feature extraction engine 103 is means for structuring the content feature database 104 as shown in FIG. 6. The content feature extraction engine 103 first acquires metadata of content. Then, the content feature extraction engine 103 identifies each area forming the content by referring to the structure of the acquired metadata, and extracts one or more words characterizing each area based on the TF-IDF value and the like. Furthermore, the content feature extraction engine 103 stores information on the content, information on the area, information on the extracted word and the like in the content feature database 104.

For example, as shown in FIG. 6, an item ID, an area ID, a feature ID, the number of updates and importance are stored in the content feature database 104. The item ID is identification information for identifying content. Also, the area ID is identification information for identifying each area forming the content. For example, the section of Title and the section of Ingredients shown in FIG. 4 are identified by the area IDs. Also, the feature ID is identification information for identifying a word characterizing a corresponding area. Also, the number of updates is information indicating the number of times details of a corresponding area have been updated. The importance is information indicating the importance of a corresponding word. Additionally, the content feature database 104 is used by the preference extraction engine 101, the case relationship extraction engine 105 and the recommendation engine 107.

(Preference Extraction Engine 101, User Preference Database 102)

Next, the preference extraction engine 101 and the user preference database 102 will be described.

When a user inputs information via an appliance 10, the information which is input is input to the preference extraction engine 101. For example, an operation log of the user is input to the preference extraction engine 101. When the operation log of the user is input, the preference extraction engine 101 extracts preference of the user based on the input operation log. Information indicating the preference of the user extracted by the preference extraction engine 101 is stored in the user preference database 102.

The user preference database 102 has a structure as shown in FIG. 7. As shown in FIG. 7, a user ID, an area ID, a feature ID and information indicating importance are stored in the user preference database 102. The user ID is identification information for identifying a user. The area ID is identification information for identifying each area forming content. The feature ID is identification information for identifying a word characterizing a corresponding area. Also, the importance is information indicating the importance of a word specified by the feature ID. Additionally, the user preference database 102 is used at the recommendation engine 107.

(Case Relationship Extraction Engine 105, Case Database 106)

Next, the case relationship extraction engine 105 and the case database 106 will be described.

The case relationship extraction engine 105 extracts a case relationship based on the information stored in the content feature database 104. This case relationship means the relationship between a situation A, a result B and a relationship R. Information indicating the case relationship extracted by the case relationship extraction engine 105 is stored in the case database 106. To be specific, a word vector for a situation A, a word vector for a result B and a word vector for a relationship R are stored in the case database 106, as shown in FIG. 8. In the example of FIG. 8, the number of dimensions is set to two for the word vector for a situation A and the word vector for a result B. An explanation will be given below based on this example setting, but the number of dimensions may be three or more.

As shown in FIG. 6, an item ID, an area ID and a feature ID are stored in the content feature database 104 in association with each other. Thus, the case relationship extraction engine 105 extracts a set of feature IDs (word A1, word A2) corresponding to the area ID set as the information source related to a situation A, and sets the same as the word vector of the situation A. Also, the case relationship extraction engine 105 extracts a set of feature IDs (word B1, word B2) corresponding to the area ID set as the information source related to a result B, and sets the same as the word vector of the result B. Furthermore, the case relationship extraction engine 105 extracts a feature ID (word R) corresponding to the area ID set as the information source related to a relationship R.

Then, the case relationship extraction engine 105 relates (word A1, word A2), (word B1, word B2) and word R corresponding to the same item ID, and store the same in the case database 106. In the example of FIG. 8, a word vector (8, 3, 10, 15) of the relationship R is extracted for the combination of the word vector (1, 5) of the situation A and the word vector (2, 1) of the result B. In this manner, the case relationship extraction engine 105 extracts a case relationship of the situation A, the result B and the relationship R from the content feature database 104, and structures the case database 106. Additionally, the case database 106 may be structured for each user. The case database 106 structured in this manner is used by the recommendation engine 107.

(Recommendation Engine 107)

Next, the recommendation engine 107 will be described.

When a recommendation request is received from a user via the appliance 10, the recommendation engine 107 extracts recommended content based on the information stored in the user preference database 102, the content feature database 104 and the case database 106. Then, the recommendation engine 107 presents to the user, as a recommendation result, a list of pieces of recommended content which have been extracted. For example, when the user selects certain content (hereinafter, new content), information on the new content is input to the recommendation engine 107. When the information on the new content is input, the recommendation engine 107 extracts, from the group of pieces of content including the new content which has been input, a set of feature IDs corresponding to the area ID set as the information source related to the situation C.

That is, the recommendation engine 107 extracts a word vector of the situation C for the new content. When the word vector of the situation C is extracted, the recommendation engine 107 extracts recommended content by using the extracted word vector of the situation C and the word vector of the relationship R stored in the case database 106. At this time, the recommendation engine 107 extracts a plurality of pieces of recommended content, and calculates a score of each piece of recommended content. Then, the recommendation engine 107 creates a list of scored pieces of recommended content, and presents the list to the user as the recommendation result.

In the foregoing, the system configuration of the recommendation system 100 has been described. Next, a flow of processing performed by the recommendation system 100 will be described in detail.

[2-2: Flow of Offline Process]

First, a flow of an offline process, among processes performed by the recommendation system 100, will be described with reference to FIGS. 9 to 12. FIGS. 9 to 12 are explanatory diagrams for describing a flow of an offline process among processes performed by the recommendation system 100. Additionally, the offline process here means a process that can be performed in a state where no recommendation request is received from the appliance 10.

Figure 9:
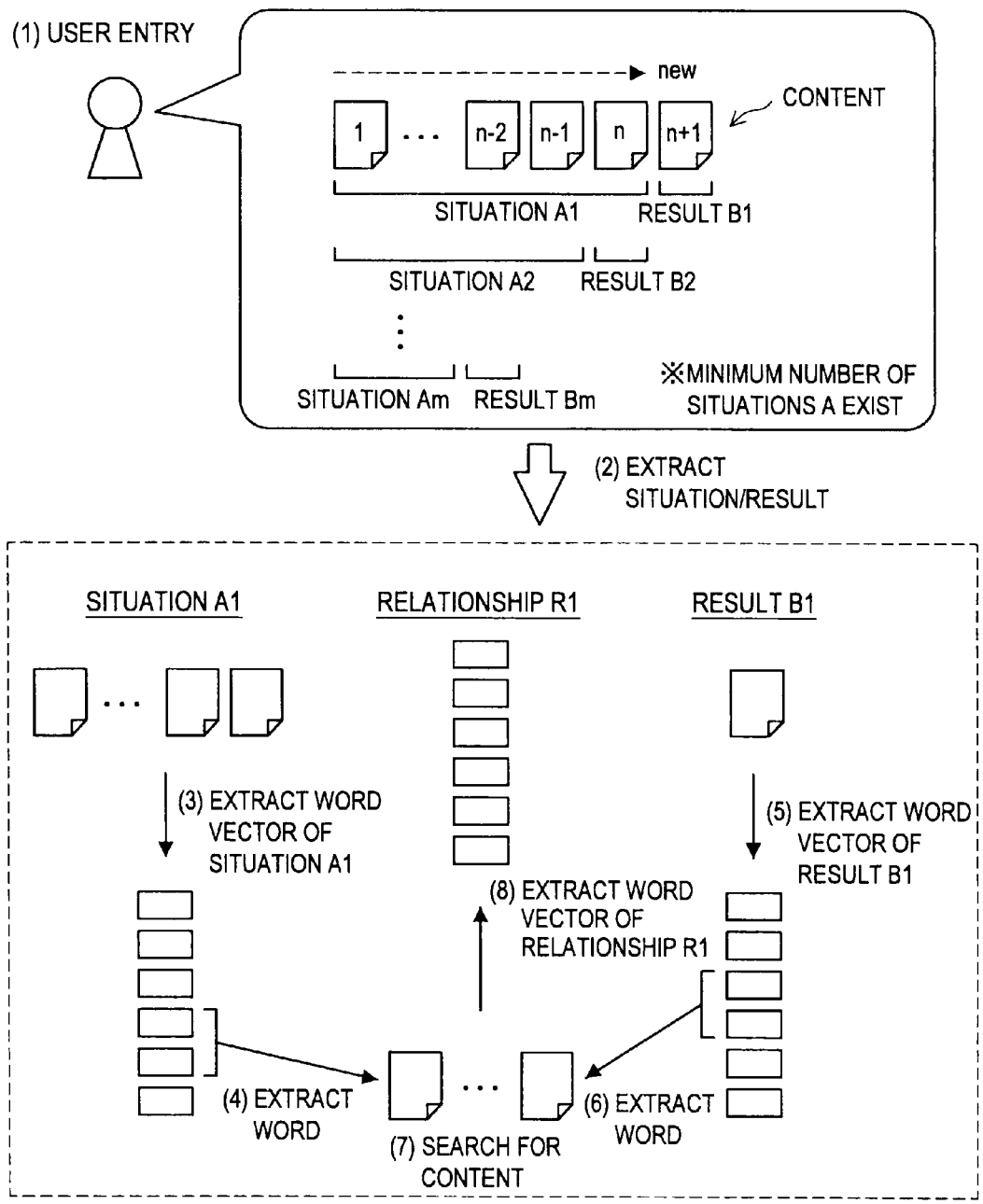
FIG. 9 is an explanatory diagram for describing a creation method of the case database according to the first embodiment of the present technology.

(FIG. 9: Overview of Offline Process)

As shown in FIG. 9, the main process that is performed as the offline process is structuring of the case database 106. As has been described, structuring of the case database 106 is realized by using mainly the function of the case relationship extraction engine 105.

A group of pieces of content created by a user in the past is used for the offline process. Thus, as shown in FIG. 9, there is a process, of a user, of creating content ((1) user entry) before the offline process. In the example of FIG. 9, n+1 pieces of content, i.e. pieces of content 1 to n+1, are prepared. Here, the larger the number added to content, the more newly created the content is. First, the case relationship extraction engine 105 selects, among the n+1 pieces of content, n pieces of content in the order from the oldest, as the information source related to a situation A. Also, the case relationship extraction engine 105 selects the newest content as the information source related to a result B. Here, the n pieces of content selected as the information source related to the situation A will be expressed as a situation A1, and the content selected as the information source related to the result B will be expressed as a result B1.

Likewise, the case relationship extraction engine 105 selects, with respect to q=1, . . . , m−1, n-q pieces of content in the order from the oldest as the information source related to the situation A. Also, the case relationship extraction engine 105 selects the q+1-th newest content as the information source related to the result B. For each q=1, . . . , m−1, the n-q pieces of content selected as the information source related to the situation A will be expressed as a situation A(q+1), and the content selected as the information source related to the result B will be expressed as a result B(q+1). Additionally, m is set in such a way that the number of pieces of content for a situation Am will be a predetermined number. When a set of a situation Ak (k=1, . . . , m) and a result Bk is extracted (2), the case relationship extraction engine 105 creates, for each k=1, . . . , m, a word vector characterizing a relationship Rk between the situation Ak and the result Bk.

Here, as an example, a creation method of a word vector characterizing a relationship R1 between the situation A1 and the result B1 will be described. First, the case relationship extraction engine 105 refers, with respect to n pieces of content for the situation A1, to an area set as the information source related to the situation A (hereinafter, an area A), and creates a word vector characterizing the area (3). For example, the case relationship extraction engine 105 creates n word vectors characterizing the areas A of pieces of content 1 to n, respectively, integrates the n word vectors and sets it as the word vector of the situation A1. Then, the case relationship extraction engine 105 extracts a word (two words in this example) from the word vector of the situation A1 (4). Additionally, in the following explanation, a set of words extracted here is sometimes referred to as the word vector of the situation A1.

Next, the case relationship extraction engine 105 creates, with respect to the content corresponding to the result B1, a word vector characterizing the area set as the information source related to the result B (hereinafter, an area B), and sets the word vector as the word vector of the result B1 (5). Then, the case relationship extraction engine 105 extracts a word (two words in this example) from the word vector of the result B1 (6). Additionally, in the following explanation, a set of words extracted here is sometimes referred to as the word vector of the result B1. Then, the case relationship extraction engine 105 searches for content including, in the area A, the words extracted from the word vector of the situation A1 and including, in the area B, the words extracted from the word vector of the result B1 (7).

Then, the case relationship extraction engine 105 creates, with respect to the content extracted by the search process, a word vector characterizing an area set as the information source related to the relationship R (hereinafter, an area R), and sets the word vector as the word vector of the relationship R1 (8). Additionally, in the case a plurality of pieces of content are extracted by the search process, a plurality of word vectors characterizing the areas R of respective pieces of content are created, and the plurality of pieces of word vectors are integrated and set as the word vector of the relationship R. The word vector of the relationship R1 created in this manner is stored in the case database 106 in association with the word extracted from the word vector of the situation A1 and the word extracted from the word vector of the result B1.

Additionally, there are a large number of combinations of words extracted from a word vector. Thus the process of (4), (6), (7) and (8) are performed for every different combination of words. Then, the word vectors created at (8) above are sequentially added to the word vector of the relationship R1. Also, the processes described above are performed not only on the combination of the situation A1 and the result B1, but on all the combinations of situations A2, . . . , Am and results B2, . . . , Bm. Then, the word vectors of relationships R1, . . . , Rm are created.

Figure 10:
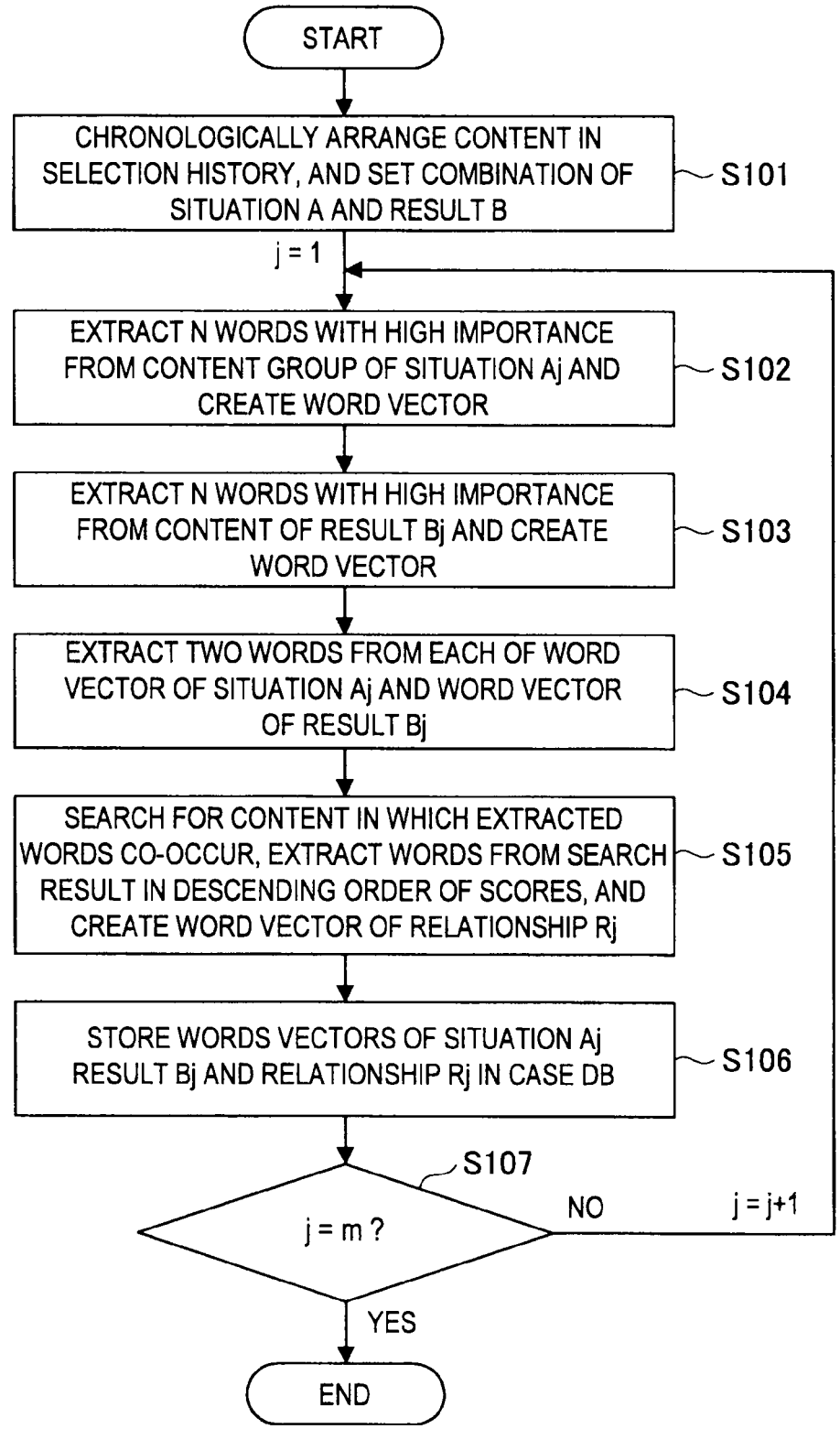
FIG. 10 is an explanatory diagram for describing the creation method of the case database according to the first embodiment of the present technology.
Figure 11:
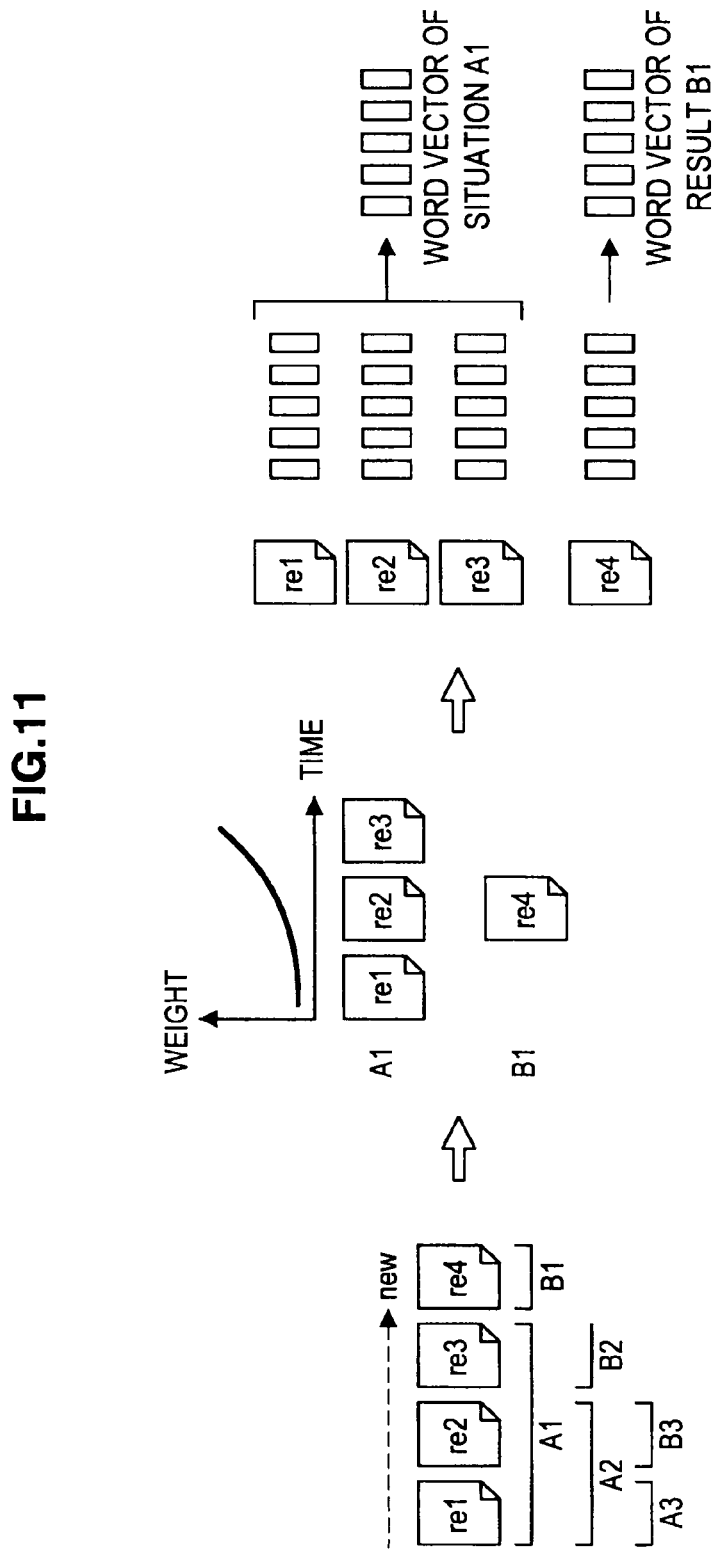
FIG. 11 is an explanatory diagram for describing the creation method of the case database according to the first embodiment of the present technology.
Figure 12:
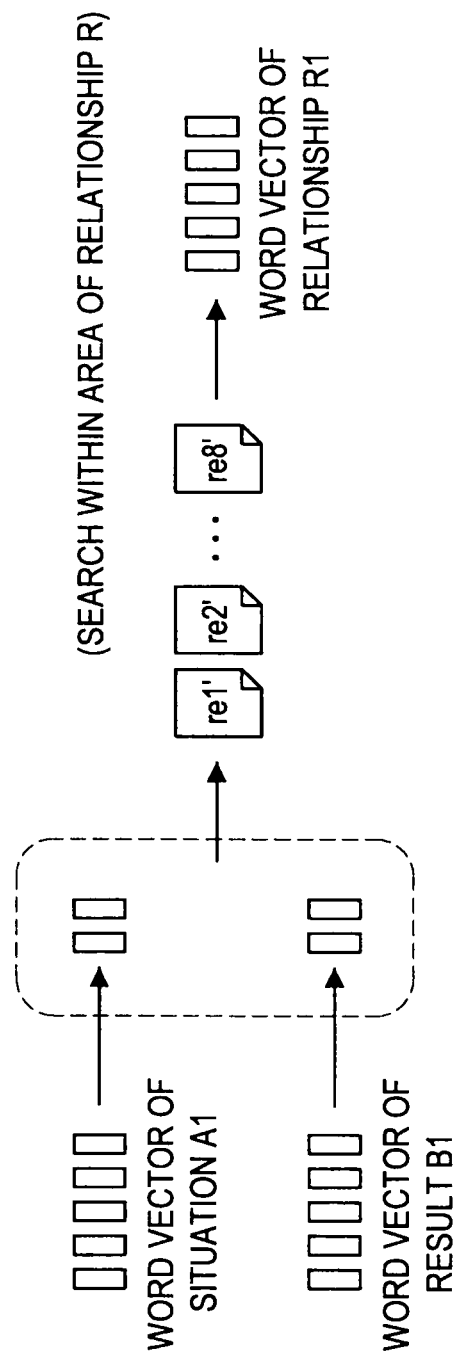
FIG. 12 is an explanatory diagram for describing the creation method of the case database according to the first embodiment of the present technology.

(FIGS. 10 to 12: Details of Offline Process)

The offline process is basically as described above. In the following, a flow of processing performed as the offline process will be described in greater detail.

As shown in FIG. 10, first, the case relationship extraction engine 105 arranges pieces of content selected by a user in the past in chronological order, and sets a combination of a situation A and a result B (S101). That is, the case relationship extraction engine 105 sets pieces of content belonging to situations A1, . . . , Am and results B1, . . . , Bm. For example, the case relationship extraction engine 105 arranges pieces of content re1, . . . , re4 in the order from the oldest, as shown in FIG. 11, and sets pieces of content belonging to the situations A1, . . . , A3 and the results B1, . . . , B3.

Then, the case relationship extraction engine 105 extracts N words (N is a natural number) with high importance from a group of pieces of content belonging to a situation Aj, and creates a word vector of the situation Aj (S102). For example, as shown in FIG. 11, the case relationship extraction engine 105 extracts N words with high importance from the pieces of content re1, re2 and re3 belonging to the situation A1, and creates a word vector of the situation A1. At this time, the case relationship extraction engine 105 weights the importance of each word such that the importance of a word included in newer content is increased. With this weighting, a characteristic word included in newer content is more likely to be included in the word vector of the situation A1.

Next, the case relationship extraction engine 105 extracts N words (N is a natural number) with high importance from a group of pieces of content belonging to a result Bj, and creates a word vector of the result Bj (S103). For example, as shown in FIG. 11, the case relationship extraction engine 105 extracts N words with high importance from the content re4 belonging to the result Bj, and creates a word vector of the result Bj. Then, as shown in FIG. 12, the case relationship extraction engine 105 extracts a word (two words in this example) from the word vector of the situation Aj, and also extracts a word (two words in this example) from the word vector of the result Bj (S104).

Next, the case relationship extraction engine 105 searches for content in which the words extracted in step S104 co-occur. Then, the case relationship extraction engine 105 extracts a word with a high score from an area R of content extracted as a search result, and sets it as the word vector of a relationship Rj (S105). In the example of FIG. 12, pieces of content re1', . . . , re8' are extracted as the search result. Also, words (five words in the example of FIG. 12) are extracted in the descending order of scores, among the words characterizing the areas R of the pieces of content re1', . . . , re8', and the word vector of the relationship Rj is created.

Additionally, a score R(ri) of a word ri is calculated based on the following Formula (4). Moreover, a word extracted from the word vector of the situation Aj is expressed as ap (p=1, 2, . . . ), and a word extracted from the word vector of the result Bj is expressed as bq (q=1, 2, . . . ). Also, a function ht(x) indicates the number of pieces of content that are found when a search for content is performed with a word x as a keyword. Furthermore, a function ht(x1, x2) indicates the number of pieces of content that are found when a search is performed for content in which a word x1 and a word x2 co-occur. Furthermore, a function ht(x1, x2, x3) indicates the number of pieces of content that are found when a search is performed for content in which a word x1, a word x2 and a word x3 co-occur. Also, the score(i, p, q) included in the following Formula (4) is defined by the following Formulae (5) to (8). Also, the N appearing in the following Formulae (6) to (8) is the total number of pieces of content.

$$scoreR(ri) = \sum_{p,q} \text{score}(i, p, q) \qquad (4)$$

$$\text{score}(i, p, q) = s1(i, p) \cdot s2(i, q) \cdot s3(i, p, q) \qquad (5)$$

$$s1(i, p) = \log\left\{1 + \frac{ht(ap, ri) \cdot N}{ht(ap) \cdot ht(ri)}\right\} \qquad (6)$$

$$s2(i, q) = \log\left\{1 + \frac{ht(bq) \cdot N}{ht(bq) \cdot ht(ri)}\right\} \qquad (7)$$

$$s3(i, p, q) = \log\left\{1 + \frac{ht(ap, bq, ri) \cdot N}{ht(ap, bq) \cdot ht(ri)}\right\} \qquad (8)$$

Then, the case relationship extraction engine 105 stores the word vectors of the situation Aj, the result Bj and the relationship Rj in the case database 106 (S106). At this time, the case relationship extraction engine 105 stores, in the case database 106, in association with each other, the word used at the time of performing a search in step S105 and the word vector of the relationship Rj. Then, the case relationship extraction engine 105 determines whether j is equal to m or not (S107). That is, the case relationship extraction engine 105 determines whether the processes of steps S102 to S106 have been performed for all the combinations regarding the situation A and the result B set in step S101. In the case j is equal to m, the case relationship extraction engine 105 ends the series of processes. In the case j is not equal to m, the case relationship extraction engine 105 increments j by one, and returns the process to step S102.

In the foregoing, the flow of the offline process has been described.

[2-3: Flow of Online Process]

Next, a flow of an online process, among processes performed by the recommendation system 100, will be described with reference to FIGS. 13 to 18. FIGS. 13 to 18 are explanatory diagrams for describing a flow of an online process among processes performed by the recommendation system 100. Additionally, the online process here means a process that is performed when a recommendation request is received from the appliance 10.

Figure 13:
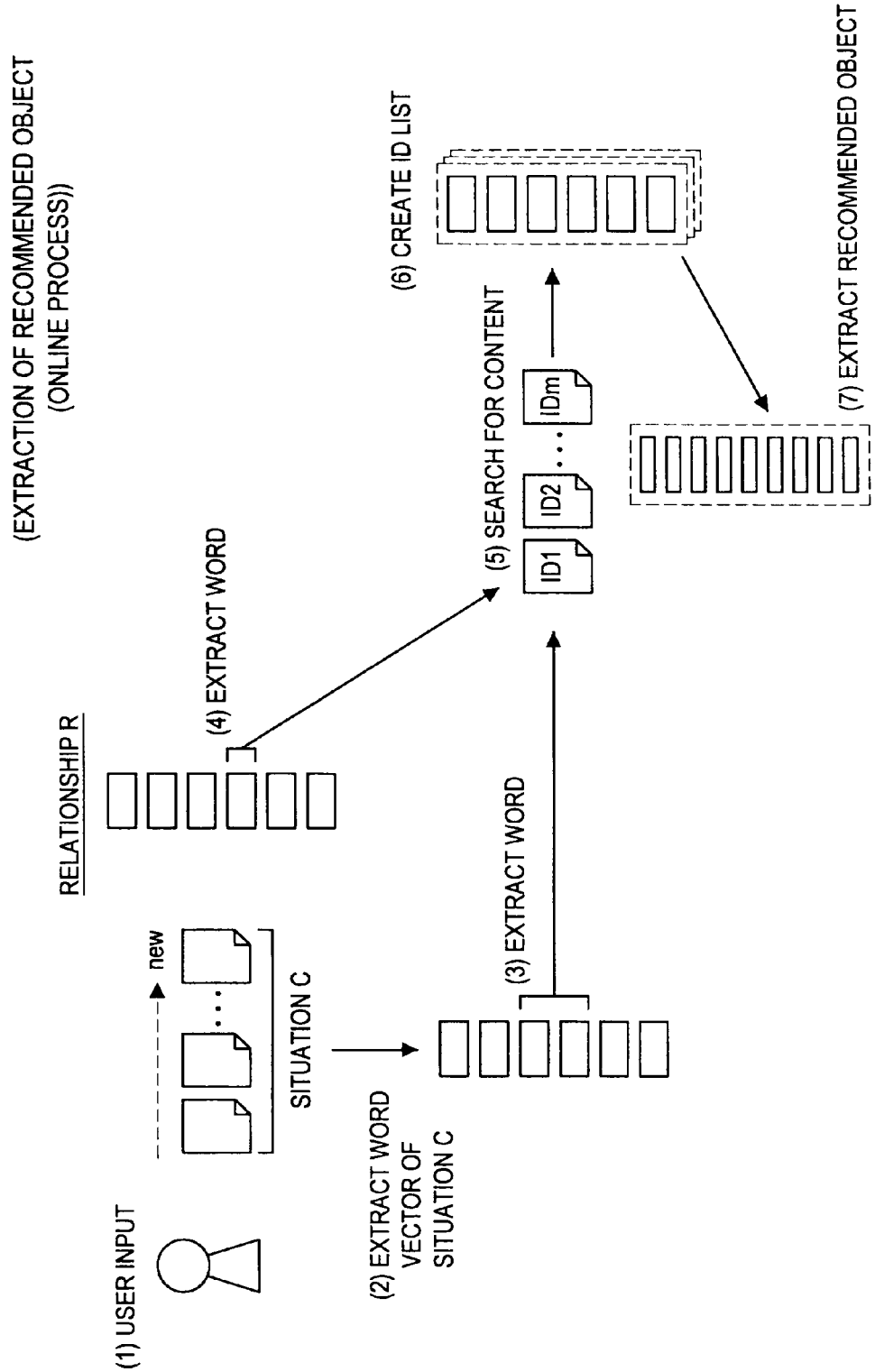
FIG. 13 is an explanatory diagram for describing a recommendation process according to the first embodiment of the present technology.

(FIG. 13: Overview of Online Process)

As shown in FIG. 13, the main process that is performed as the online process is a search for recommended content and presentation of a search result by the recommendation engine 107.

As described above, the online process is performed when a recommendation request is received. That is, the online process is performed when a user selects new content. When new content is selected ((1) user input), the recommendation engine 107 extracts a word vector of a situation C (2). At this time, the recommendation engine 107 first extracts a word vector indicating preference of a user (hereinafter, a preference vector) from the user preference database 102, and updates the preference vector by using a word characterizing an area set as the information source related to the situation C of the new content (hereinafter, an area C). Then, the recommendation engine 107 sets the updated preference vector as the word vector of the situation C.

Next, the recommendation engine 107 extracts a word (two words in this example) from the word vector of the situation C (3). Then, the recommendation engine 107 refers to the case database 106, and extracts a word (one word in this example) from the word vector of a relationship R (4). Then, the recommendation engine 107 searches for content in which the words extracted from the word vector of the situation C appear in the area C and the word extracted from the word vector of the relationship R appears in the area R (5). Then, the recommendation engine 107 creates a list of item IDs (hereinafter, a recommendation list) indicating the pieces of content extracted by the search process (6).

There are a large number of combinations of words extracted from the word vector of the situation C and the word vector of the relationship R. Thus, the creation process of a recommendation list is repeatedly performed for different combinations, and a plurality of recommendation lists are created. The recommendation engine 107 integrates the plurality of recommendation lists, and also adds a score to each piece of recommended content. Then, the recommendation engine 107 selects a combination of pieces of recommended content which are to be recommended, based on the added scores, and creates a recommendation list including the selected pieces of recommended content (7).

(FIGS. 14 to 18: Details of Online Process)

As described above, the online process is roughly divided into an update process of a preference vector used at the time of creating a word vector of a situation C and a creation process of a recommendation list.

(Update Process of Preference Vector)

First, an update process of a preference vector will be described with reference to FIG. 14.

Figure 14:
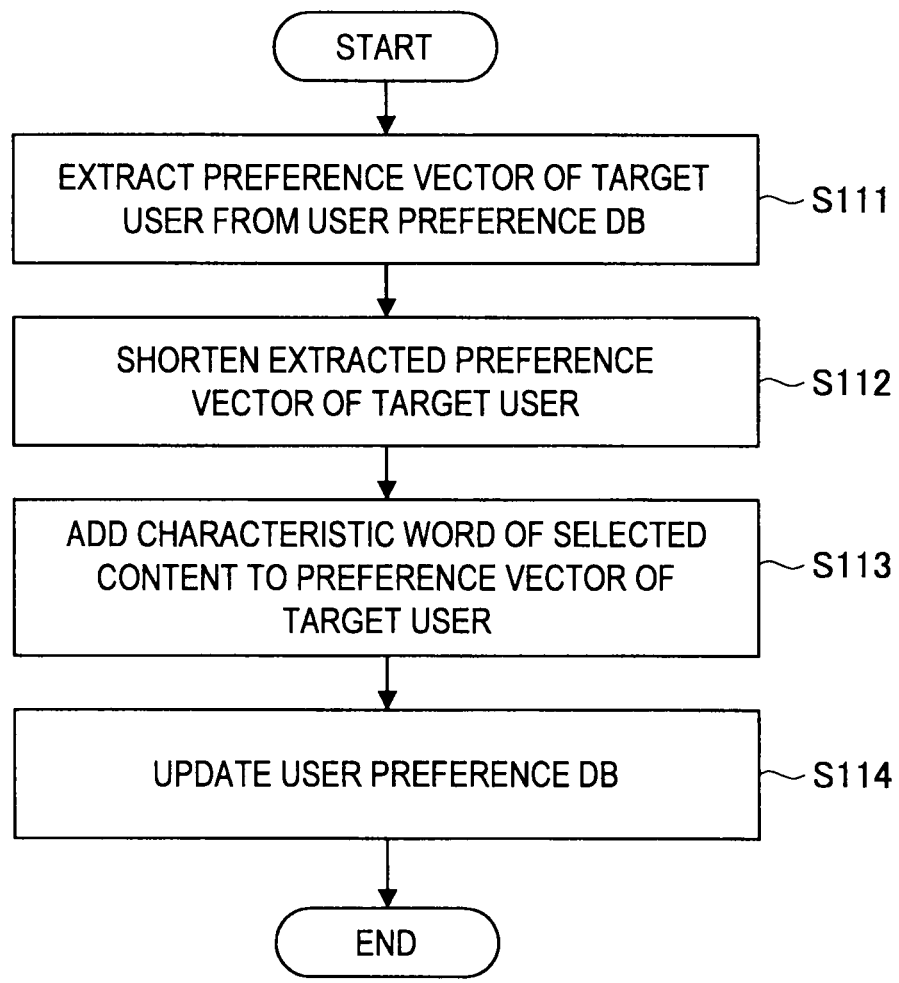
FIG. 14 is an explanatory diagram for describing a preference learning process according to the first embodiment of the present technology.

As shown in FIG. 14, first, the recommendation engine 107 extracts a preference vector of a user who has performed a recommendation request (hereinafter, a target user) from the user preference database 102 (S111). For example, the recommendation engine 107 extracts a predetermined number of feature IDs with high importance among feature IDs corresponding to the user ID of the target user and the area ID of the area C, and sets a preference vector. Then, the recommendation engine 107 shortens the preference vector of the target user extracted in step S111 (S112). For example, the recommendation engine 107 eliminates a predetermined number of feature IDs with low importance among the feature IDs included in the preference vector.

Then, the recommendation engine 107 extracts a word characterizing the area C of new content selected by the target user, and adds the feature ID corresponding to the extracted word to the preference vector (S113). Additionally, in a case a plurality of pieces of new content are selected, a word characterizing the area C is extracted based on the importance weighted in the descending order from the newest, and the feature ID corresponding to the word is added to the preference vector (see FIG. 16). Next, the recommendation engine 107 updates the record of the user preference database 102 in synchronisation with the preference vector to which the feature ID has been added in step S113 (S114), and ends the series of processes.

A preference vector updated by the information of new content selected by a target user is obtained by the above processes. Additionally, the update process of the user preference database 102 described above may be performed by the preference extraction engine 101.

(Creation Process of Recommendation List)

Next, a creation process of a recommendation list will be described with reference to FIGS. 15 to 18.

Figure 15:
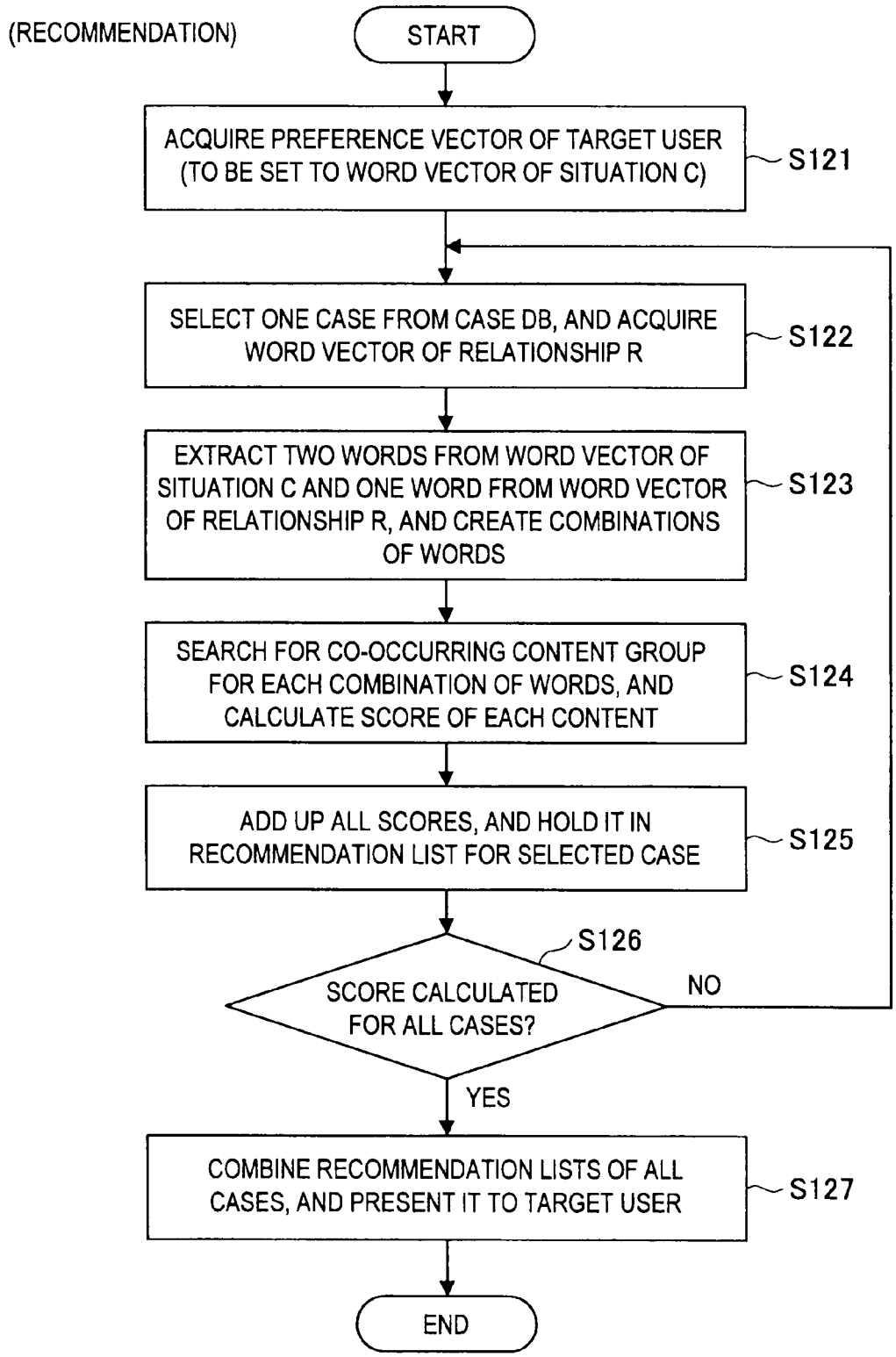
FIG. 15 is an explanatory diagram for describing the recommendation process according to the first embodiment of the present technology.
Figure 16:
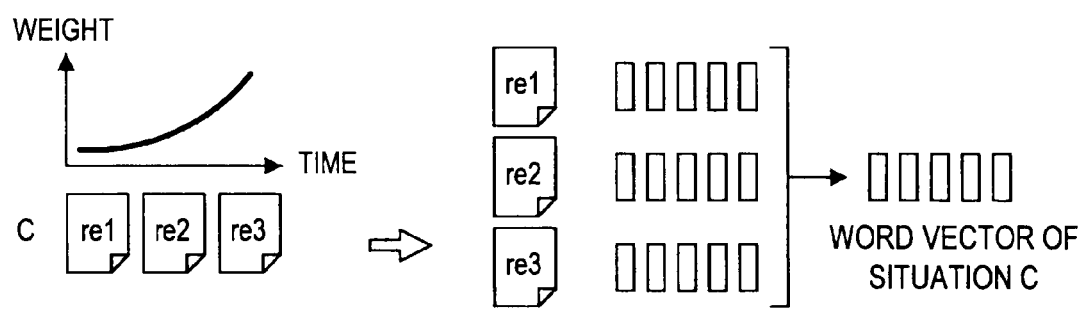
FIG. 16 is an explanatory diagram for describing the recommendation process according to the first embodiment of the present technology.

As shown in FIG. 15, first, the recommendation engine 107 acquires a preference vector of a target user from the user preference database 102, and sets a word vector of the situation C (S121). Additionally, the update method of a preference vector in accordance with selection of new content is as described above, and the creation method of the preference vector (the word vector of the situation C) is schematically shown in FIG. 16. Next, the recommendation engine 107 selects one case from the case database 106, and acquires a word vector of a relationship R corresponding to the case (S122).

Figure 18:
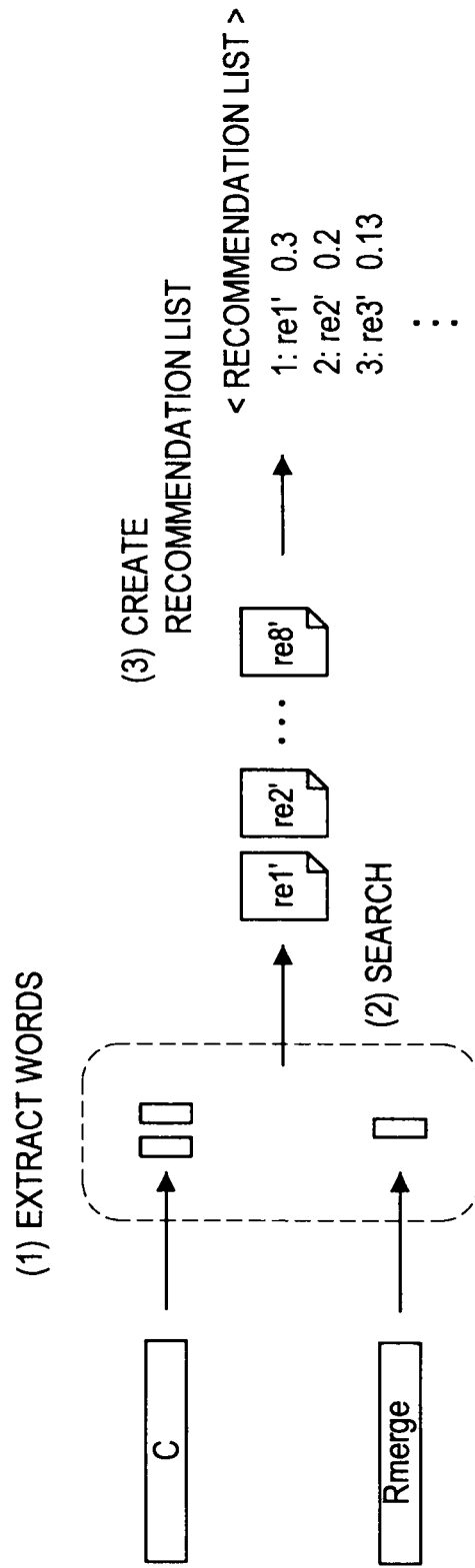
FIG. 18 is an explanatory diagram for describing the recommendation process according to the first embodiment of the present technology.

Next, as shown in (1) of FIG. 18, the recommendation engine 107 extracts a word (two words in this example) from the word vector of the situation C, extracts a word (one word in this example) from the word vector of the relationship R, and creates combinations of words (S123). Then, the recommendation engine 107 searches, with respect to each combination of words, for a group of pieces of content that co-occur, and calculates a score for each piece of content (S124). This score is calculated based on the following Formula (9). Moreover, s1, s2 and s3 included in the following Formula (9) are defined by the following Formulae (10) to (12). Also, c1 and c2 express words extracted from the word vector of the situation C.

$$\text{score}(ri) = s1(i) \cdot s2(i) \cdot s3(i) \qquad (9)$$

$$s1(i) = \log\left\{1 + \frac{ht(c1, ri) \cdot N}{ht(c1) \cdot ht(ri)}\right\} \qquad (10)$$

$$s2(i) = \log\left\{1 + \frac{ht(c2, ri) \cdot N}{ht(c2) \cdot ht(ri)}\right\} \qquad (11)$$

$$s3(i) = \log\left\{1 + \frac{ht(c1, c2, ri) \cdot N}{ht(c1, c2) \cdot ht(ri)}\right\} \qquad (12)$$

There are a large number of combinations of a word extracted from the word vector of the situation C and a word extracted from the word vector of the relationship R. Thus, the recommendation engine 107 calculates the score described above for every combination, adds up the scores for each piece of content, and creates a recommendation list listing the score of each piece of content (S125). Then, the recommendation engine 107 determines whether the recommendation list is created for all the cases or not (S126).

In the case the recommendation list is created for all the cases, the recommendation engine 107 proceeds with the process to step S127. On the other hand, in the case the recommendation list is not created for all the cases, the recommendation engine 107 returns the process to step S122, and creates the recommendation list for a case for which the recommendation list has not been created. In the case the process is proceeded to step S127, the recommendation engine 107 presents, in combination, the recommendation lists for all the cases to the target user (S127), and ends the series of processes.

(Modified Example: Method for Reducing Amount of Calculation)

In the processing steps shown in FIG. 15, the recommendation list was created for each one of the cases. However, modification as follows enables to simplify the process.

Figure 17:
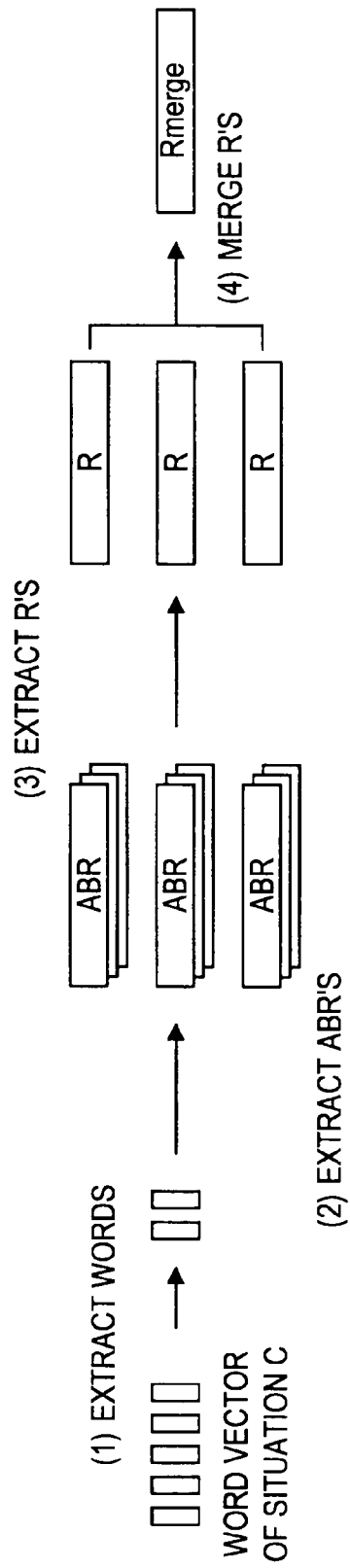
FIG. 17 is an explanatory diagram for describing the recommendation process according to the first embodiment of the present technology.

First, as shown in FIG. 17, the recommendation engine 107 acquires a word vector of a situation C. Next, the recommendation engine 107 extracts a word (two words in this example) from the word vector of the situation C (1). Then, the recommendation engine 107 refers to the case database 106, and extracts sets of a situation A, a result B and a relationship R, where the words (two words in this example) extracted from the word vector of the situation C match the word vector (word A1, word A2) of the situation A (2). Then, the recommendation engine 107 extracts the word vectors of the relationships R from the extracted sets (3). Then, the recommendation engine 107 merges the word vectors of the relationships R which have been extracted, and creates a merged vector Rmerge (4).

Next, as shown in FIG. 18, the recommendation engine 107 extracts a word (two words in this example) from the word vector of the situation C, and extracts a word (one word in this example) from the merged vector Rmerge (1). Next, the recommendation engine 107 searches for content in which the set of extracted words co-occurs (2). Then, the recommendation engine 107 creates a recommendation list of pieces of content extracted by the search process (3). Additionally, the calculation method of the score to be added to each piece of content is the same as the method described above. Next, the recommendation engine 107 presents the recommendation list created in the above (3) to the user. With these processing steps, the amount of calculation can be reduced.

In the foregoing, the first embodiment of the present technology has been described.

3: Second Embodiment

Next, a second embodiment of the present technology will be described.

[3-1: System Configuration]

Figure 19:
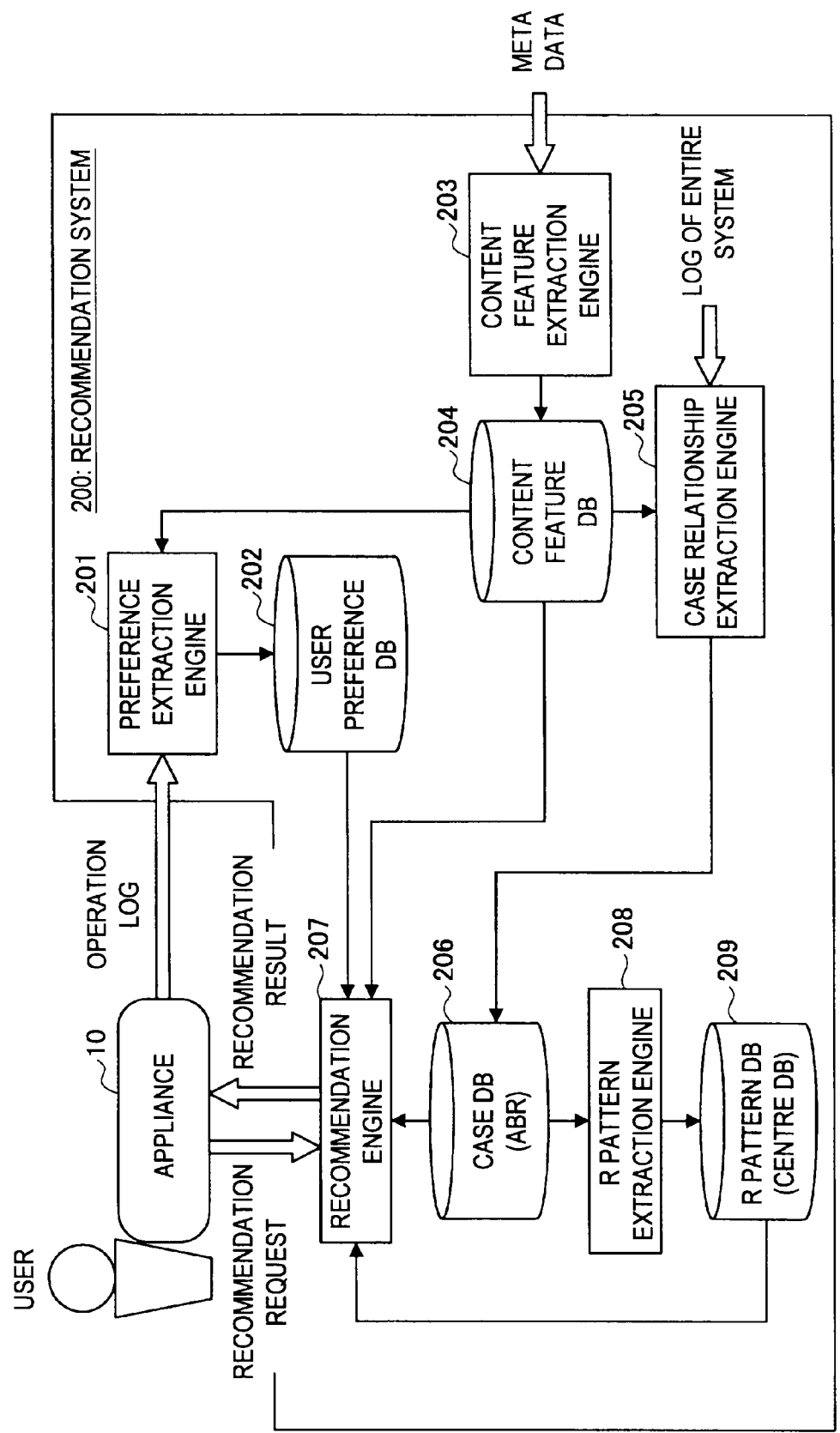
FIG. 19 is an explanatory diagram for describing a configuration of a recommendation system according to a second embodiment of the present technology.

First, a system configuration of a recommendation system 200 according to the present embodiment will be described with reference to FIG. 19. FIG. 19 is an explanatory diagram for describing a system configuration of the recommendation system 200 according to the present embodiment.

As shown in FIG. 19, the recommendation system 200 is configured mainly from a preference extraction engine 201, a user preference database 202, a content feature extraction engine 203, a content feature database 204, a case relationship extraction engine 205, a case database 206, a recommendation engine 207, an R pattern extraction engine 208 and an R pattern database 209 (a centre database).

Additionally, the functions of the preference extraction engine 201, the content feature extraction engine 203, the case relationship extraction engine 205, the recommendation engine 207 and the R pattern extraction engine 208 are realized by the functions of the CPU 902 or the like among the hardware configuration shown in FIG. 38. Also, the user preference database 202, the content feature database 204, the case database 206 and the R pattern database 209 are realized by the functions of the ROM 904, the RAM 906, the storage unit 920, the removable recording medium 928 and the like among the hardware configuration shown in FIG. 38. Furthermore, the function of the recommendation system 200 may be realized using a single piece of hardware or a plurality of pieces of hardware connected via a network or a leased line.

(Content Feature Extraction Engine 203, Content Feature Database 204)

First, the content feature extraction engine 203 and the content feature database 204 will be described.

The content feature extraction engine 203 is means for structuring the content feature database 204. The content feature extraction engine 203 first acquires metadata of content. Then, the content feature extraction engine 203 identifies each area forming the content by referring to the structure of the acquired metadata, and extracts one or more words characterizing each area based on the TF-IDF value and the like. Furthermore, the content feature extraction engine 203 stores information on the content, information on the area, information on the extracted word and the like in the content feature database 204. Additionally, the structure of the content feature database 204 is substantially the same as the structure of the content feature database 104 shown in FIG. 6. This content feature database 204 is used by the preference extraction engine 201, the case relationship extraction engine 205 and the recommendation engine 207.

(Preference Extraction Engine 201, User Preference Database 202)

Next, the preference extraction engine 201 and the user preference database 202 will be described.

When a user inputs information via an appliance 10, the information which is input is input to the preference extraction engine 201. For example, an operation log of the user is input to the preference extraction engine 201. When the operation log of the user is input, the preference extraction engine 201 extracts preference of the user based on the input operation log. Information indicating the preference of the user extracted by the preference extraction engine 201 is stored in the user preference database 202. Additionally, the structure of the user preference database 202 is substantially the same as the structure of the user preference database 102 shown in FIG. 7. This user preference database 202 is used by the recommendation engine 207.

(Case Relationship Extraction Engine 205, Case Database 206)

Next, the case relationship extraction engine 205 and the case database 206 will be described.

The case relationship extraction engine 205 extracts a case relationship based on the information stored in the content feature database 204. Information indicating the case relationship extracted by the case relationship extraction engine 205 is stored in the case database 206. Additionally, the structure of the case database 206 is substantially the same as the structure of the case database 106 shown in FIG. 8. The case database 206 which has been structured is used by the recommendation engine 207 and the R pattern extraction engine 208.

(R Pattern Extraction Engine 208, R Pattern Database 209)

Next, the R pattern extraction engine 208 and the R pattern database 209 will be described.

The R pattern extraction engine 208 performs clustering for each case using the word vector of a relationship R stored in the case database 206. Then, the R pattern extraction engine 208 calculates, for each cluster, the term frequency of each word included in the word vector of the relationship R. Then, the R pattern extraction engine 208 selects, as a word indicating the centre of the cluster (hereinafter, a centre word), a set of words with the highest term frequency or of words with high term frequency, and registers the same in the R pattern database 209. Furthermore, the R pattern extraction engine 208 registers the correspondence relationship between each cluster and each case in the R pattern database 209.

The R pattern database 209 has structures as shown in FIGS. 20 and 21. Additionally, the centre database is assumed here to be a part of the R pattern database 209, but the centre database and the R pattern database 209 may be separately provided. Now, the centre database has a structure as shown in FIG. 20. As shown in FIG. 20, a cluster ID and a centre word ID are stored in the centre database in association with each other. The cluster ID is identification information for identifying a cluster. Also, the centre word ID is identification information for identifying a centre word.

Furthermore, with respect to the relationship between a cluster and a case, the R pattern database 209 has a structure as shown in FIG. 21. As shown in FIG. 21, a cluster ID, a word vector of a situation A, a word vector of a result B and a word vector of a relationship R are stored in the R pattern database 209 in association with each other. This R pattern database 209 is used by the recommendation engine 207.

(Recommendation Engine 207)

Next, the recommendation engine 207 will be described.

When a recommendation request is received from a user via the appliance 10, the recommendation engine 207 extracts recommended content based on the information stored in the user preference database 202, the content feature database 204, the case database 206 and the R pattern database 209. Then, the recommendation engine 207 presents to the user, as a recommendation result, a list of pieces of recommended content which have been extracted. For example, when the user selects certain content (hereinafter, new content), information on the new content is input to the recommendation engine 207. When the information on the new content is input, the recommendation engine 207 extracts, from the group of pieces of content including the new content which has been input, a word vector of the situation C.

When the word vector of the situation C is extracted, the recommendation engine 207 reads information on clusters from the R pattern database 209 (hereinafter, R patterns) and presents the same to the user. For example, the recommendation engine 207 presents the centre words to the user. When the user selects an R pattern from the presented R patterns, the recommendation engine 207 extracts the word vector of the relationship R corresponding to the selected R pattern. Furthermore, the recommendation engine 207 extracts recommended content by using the word vector of the situation C and the word vector of the relationship R which have been extracted. Then, the recommendation engine 207 calculates a score of each piece of recommended content, and presents a list of scored pieces of recommended content to the user.

In the foregoing, the system configuration of the recommendation system 200 has been described. Next, a flow of processing performed by the recommendation system 200 will be described in detail.

[3-2: Flow of Offline Process]

An offline process according to the present embodiment is substantially the same as the offline process of the first embodiment up to the creation of the case database 206.

Figure 24:
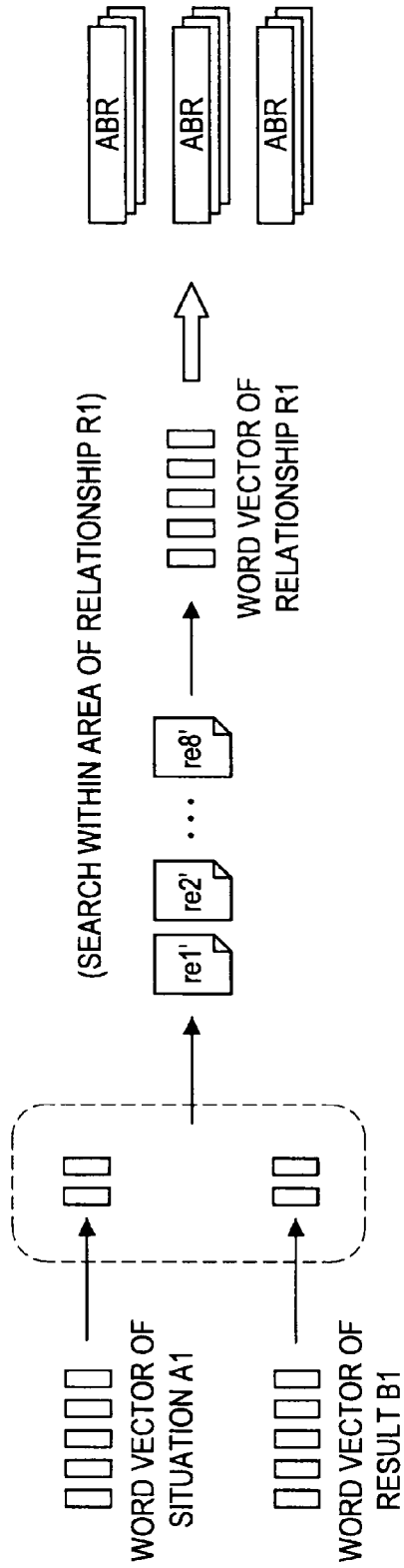
FIG. 24 is an explanatory diagram for describing the recommendation process according to the second embodiment of the present technology.

First, as shown in FIG. 24 (this example shows a case of j=1), the case relationship extraction engine 205 extracts a word (two words in this example) from a word vector of a situation Aj, and also extracts a word (two words in this example) from a word vector of a result Bj. Next, the case relationship extraction engine 205 searches for content in which the extracted words co-occur. Then, the case relationship extraction engine 205 extracts a word with a high score from an area R of content extracted as the search result and sets the same as the word vector of a relationship Rj. The word vector of the relationship Rj set in this manner is stored in the case database 206.

The difference between the offline process of the present embodiment and the offline process of the first embodiment lies in the presence/absence of the process of structuring the R pattern database 209. Thus, the process of structuring the R pattern database 209 performed by the R pattern extraction engine 208 will be described with reference to FIGS. 25 and 26.

Figure 25:
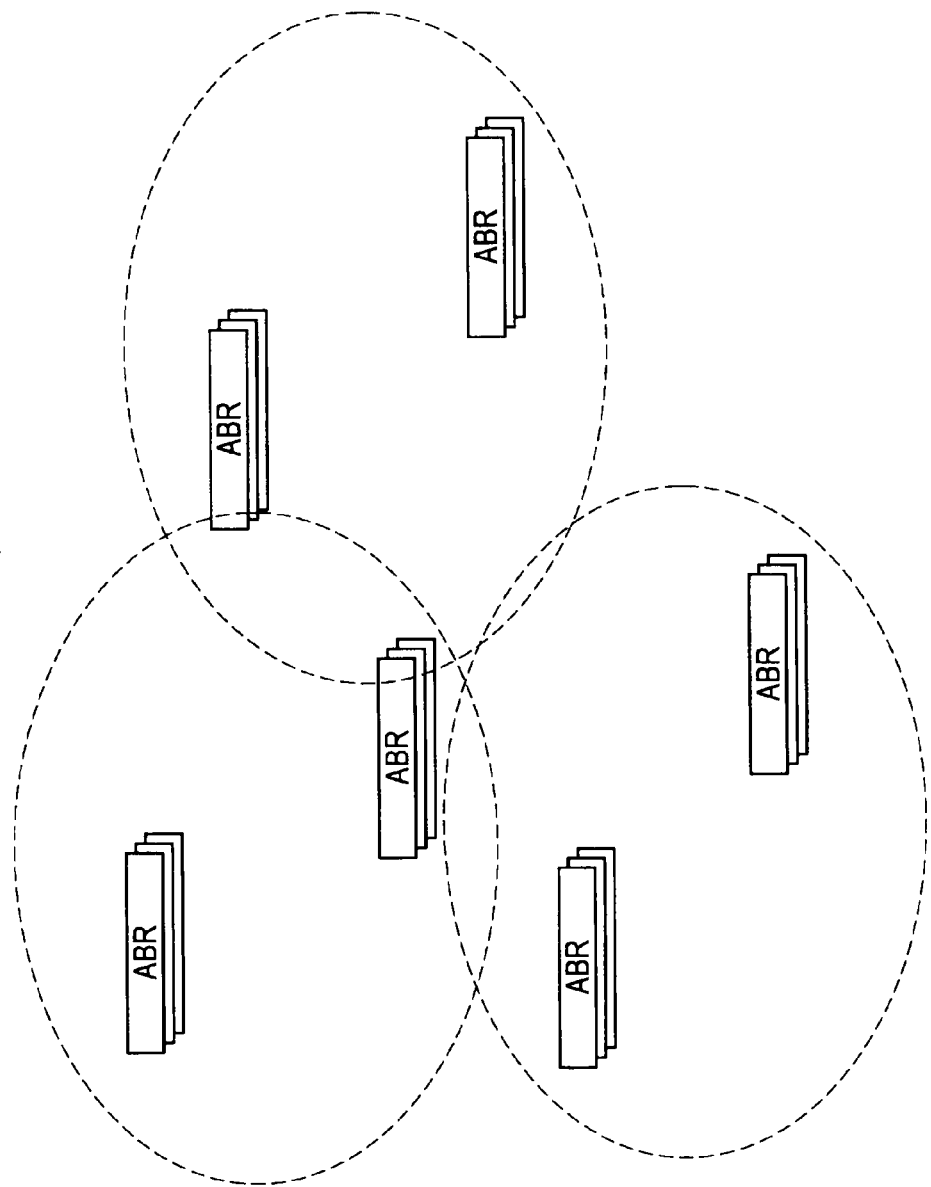
FIG. 25 is an explanatory diagram for describing a clustering process according to the second embodiment of the present technology.
Figure 26:
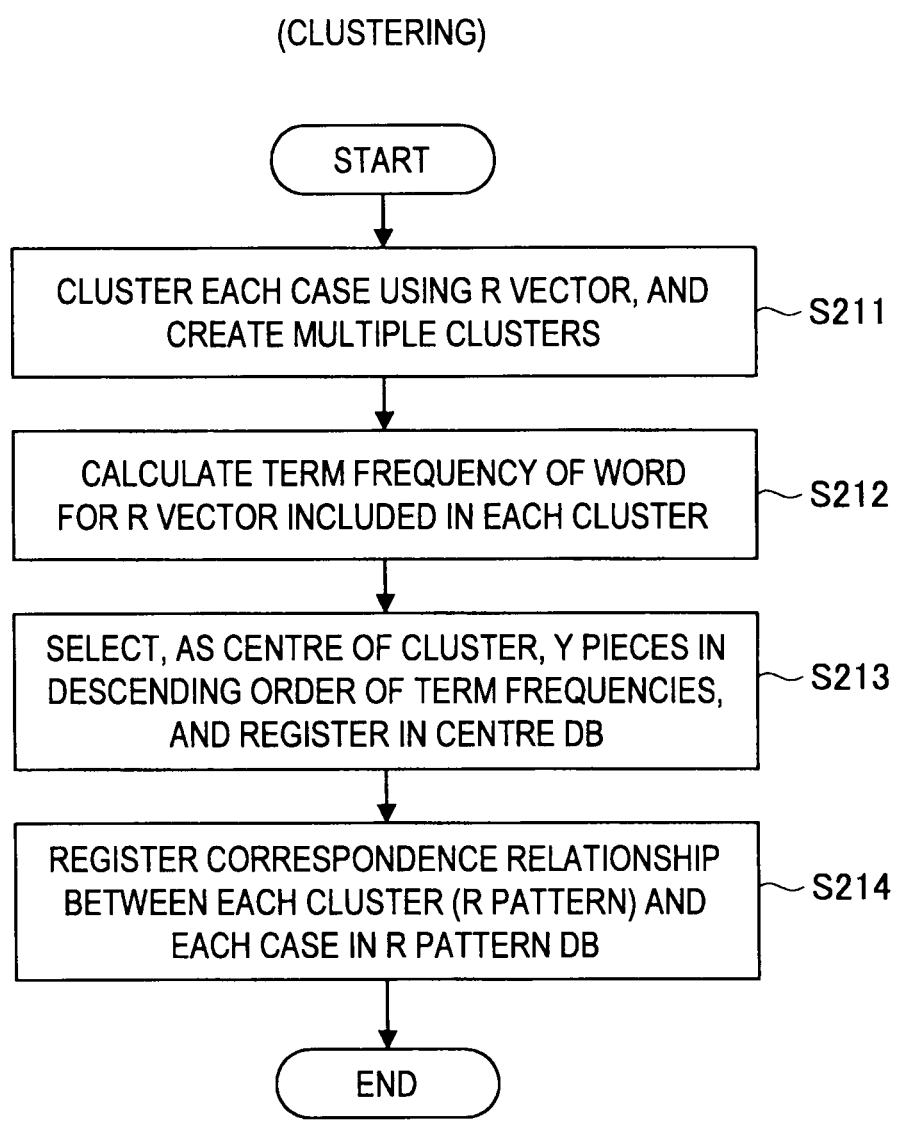
FIG. 26 is an explanatory diagram for describing the clustering process according to the second embodiment of the present technology.

As shown in FIG. 26, the R pattern extraction engine 208 first performs clustering for each case using the word vector of a relationship R (S211; see FIG. 25). Then, the R pattern extraction engine 208 calculates the term frequency of each word included in the word vector of the relationship R belonging to each cluster (S212). Then, the R pattern extraction engine 208 selects, as a centre word, a set of words with the highest term frequency or of words with high term frequency calculated in step S212, and registers the same in the centre database (the R pattern database 209) (S213). Next, the R pattern extraction engine 208 registers the correspondence relationship between a cluster and a case in the R pattern database 209 (S214), and ends the series of processes related to structuring of the R pattern database 209.

In the foregoing, a flow of the offline process has been described.

[3-3: Flow of Online Process]

Next, a flow of an online process, among processes performed by the recommendation system 200, will be described with reference to FIGS. 22, 23, and 27 to 29. FIGS. 22, 23, and 27 to 29 are explanatory diagrams for describing a flow of an online process among processes performed by the recommendation system 200.

Figure 22:
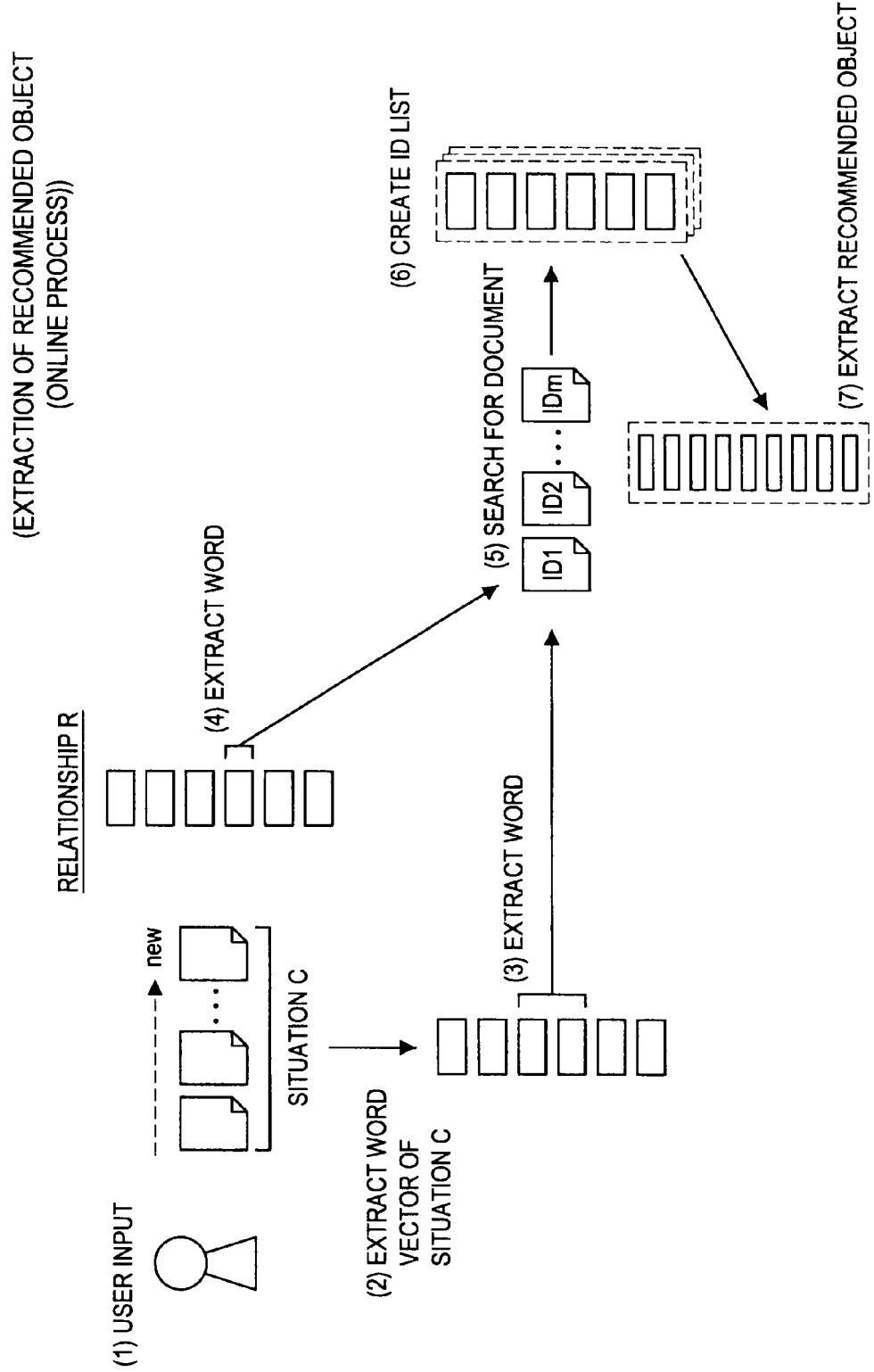
FIG. 22 is an explanatory diagram for describing a recommendation process according to the second embodiment of the present technology.

(FIG. 22: Overview of Online Process)

As shown in FIG. 22, the main process that is performed as the online process is presentation of an R pattern, a search for recommended content and presentation of a search result by the recommendation engine 207.

As described above, the online process is performed when a recommendation request is received. That is, the online process is performed when a user selects new content. When new content is selected ((1) user input), the recommendation engine 207 extracts a word vector of a situation C (2). At this time, the recommendation engine 207 first extracts a preference vector from the user preference database 202, and updates the preference vector by using a word characterizing an area C of the new content. Then, the recommendation engine 207 sets the updated preference vector as the word vector of the situation C.

Next, the recommendation engine 207 extracts a word (two words in this example) from the word vector of the situation C (3). Then, the recommendation engine 207 reads R patterns from the R pattern database 209, and presents the R patterns which have been read to the user. When the user selects an R pattern from the presented R patterns, the recommendation engine 207 extracts a word (one word in this example) from the word vector of a relationship R corresponding to the R pattern selected by the user (4). Then, the recommendation engine 207 searches for content in which the words extracted from the word vector of the situation C appears in the area C and the word extracted from the word vector of the relationship R appears in the area R (5). Then, the recommendation engine 207 creates a list of item IDs (a recommendation list) indicating the pieces of content extracted by the search process (6).

There are a large number of combinations of words extracted from the word vector of the situation C and the word vector of the relationship R. Thus, the creation process of a recommendation list is repeatedly performed for different combinations, and a plurality of recommendation lists are created. The recommendation engine 207 integrates the plurality of recommendation lists, and also adds a score to each piece of recommended content. Then, the recommendation engine 207 selects a combination of pieces of recommended content which are to be recommended, based on the added scores, and creates a recommendation list including the selected pieces of recommended content (7).

(FIGS. 23, 27 to 29: Details of Online Process)

As described above, the online process according to the present embodiment includes a process, performed by a user, of selecting an R pattern. Here, the flow of the online process will be described in greater detail.

Figure 23:
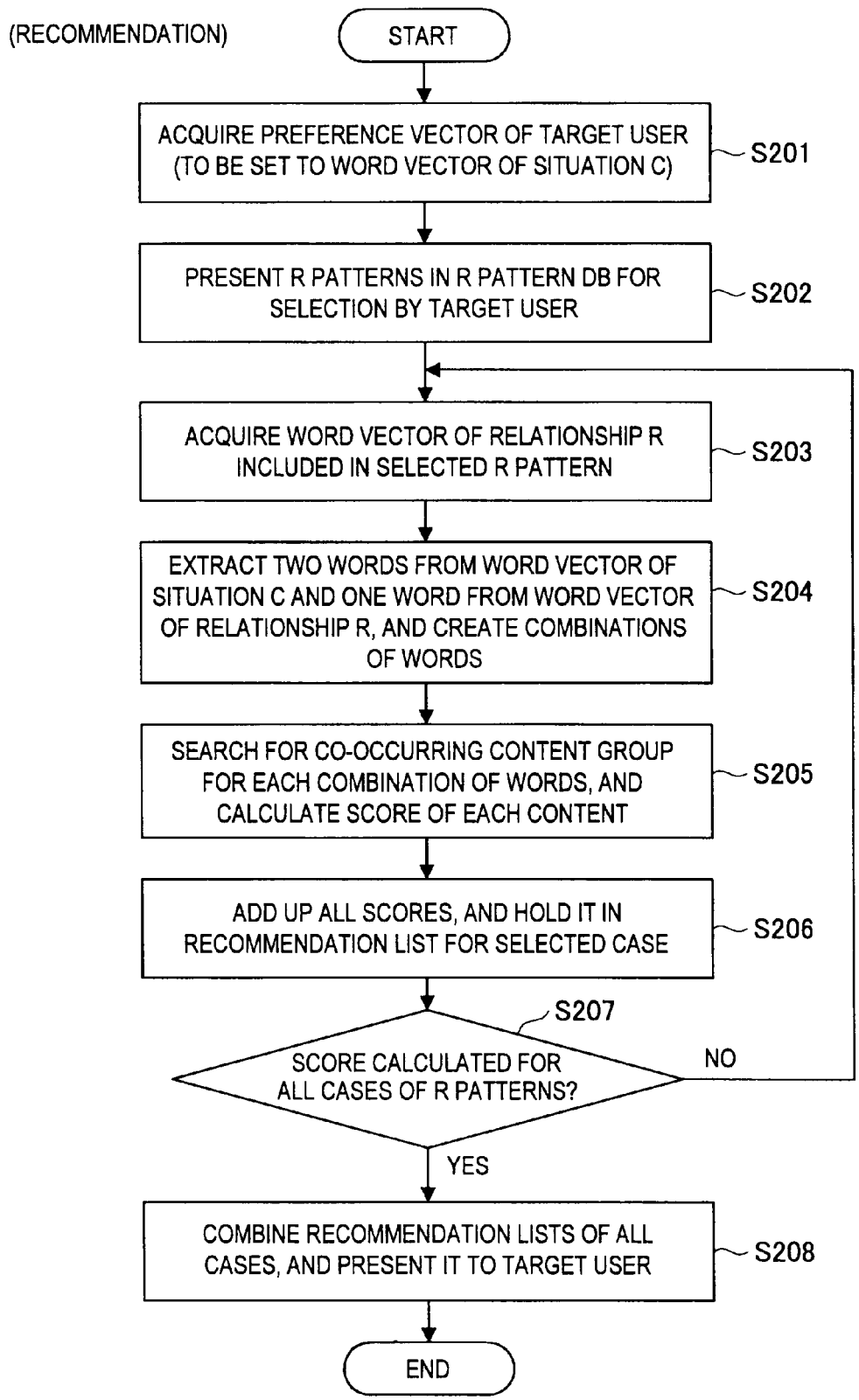
FIG. 23 is an explanatory diagram for describing the recommendation process according to the second embodiment of the present technology.
Figure 27:
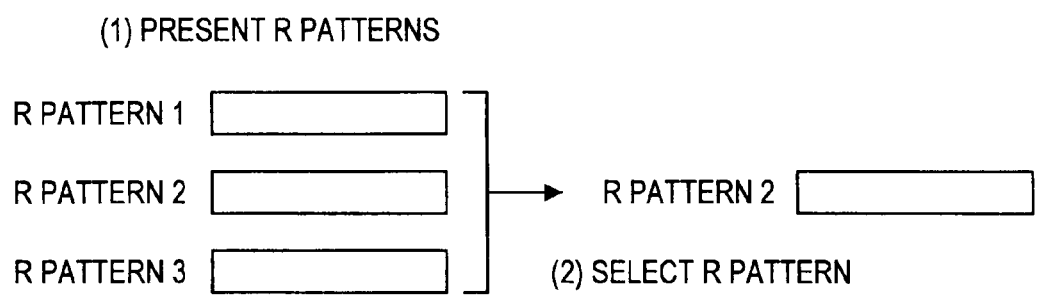
FIG. 27 is an explanatory diagram for describing selection of an R pattern according to the second embodiment of the present technology.

As shown in FIG. 23, first, the recommendation engine 207 acquires a preference vector of a target user from the user preference database 202, and sets the same as the word vector of the situation C (S201). Additionally, the update method of the preference vector in accordance with selection of new content and the creation method of the preference vector (the word vector of the situation C) are substantially the same as the methods described in the first embodiment. Then, as shown in FIG. 27, the recommendation engine 207 presents a plurality of R patterns to the user, and causes the user to select one R pattern (S202). Then, the recommendation engine 207 acquires the word vector of the relationship R corresponding to the selected R pattern (S203).

Figure 29:
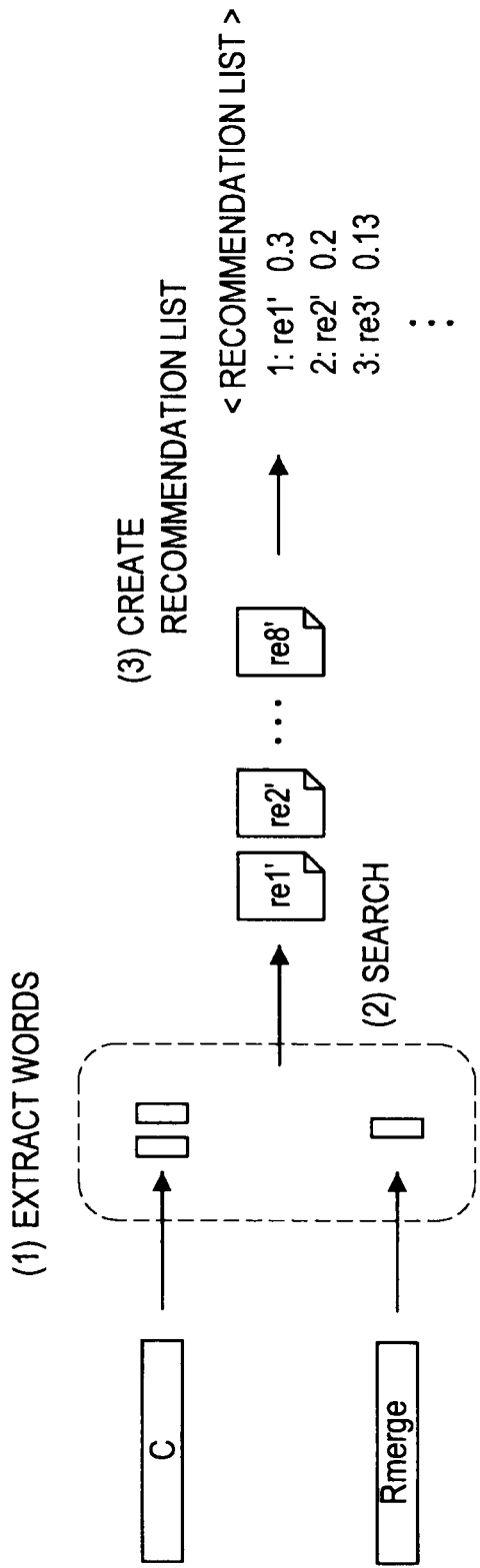
FIG. 29 is an explanatory diagram for describing the recommendation process according to the second embodiment of the present technology.

Next, as shown in FIG. 29, the recommendation engine 207 extracts a word (two words in this example) from the word vector of the situation C, extracts a word (one word in this example) from the word vector of the relationship R, and creates combinations of words (S204). Then, the recommendation engine 207 searches, with respect to each combination of words, for a group of pieces of content that co-occur, and calculates a score for each piece of content (S205). Additionally, the calculation method of the score is substantially the same as the method described in the first embodiment.

There are a large number of combinations of a word extracted from the word vector of the situation C and a word extracted from the word vector of the relationship R. Thus, the recommendation engine 207 calculates the score described above for every combination, adds up the scores for each piece of content, and creates a recommendation list listing the score of each piece of content (S206). Then, the recommendation engine 207 determines whether the recommendation list is created for all the cases or not (S207).

In the case the recommendation list is created for all the cases, the recommendation engine 207 proceeds with the process to step S208. On the other hand, in the case the recommendation list is not created for all the cases, the recommendation engine 207 returns the process to step S203, and creates the recommendation list for a case for which the recommendation list is not created. In the case the process is proceeded to step S208, the recommendation engine 207 presents, in combination, the recommendation lists for all the cases to the target user (S208), and ends the series of processes.

(Modified Example: Method for Reducing Amount of Calculation)

According to the processing steps shown in FIG. 23, the recommendation list was created for each one of the cases. However, as with the first embodiment, modification as follows enables to simplify the process.

Figure 28:
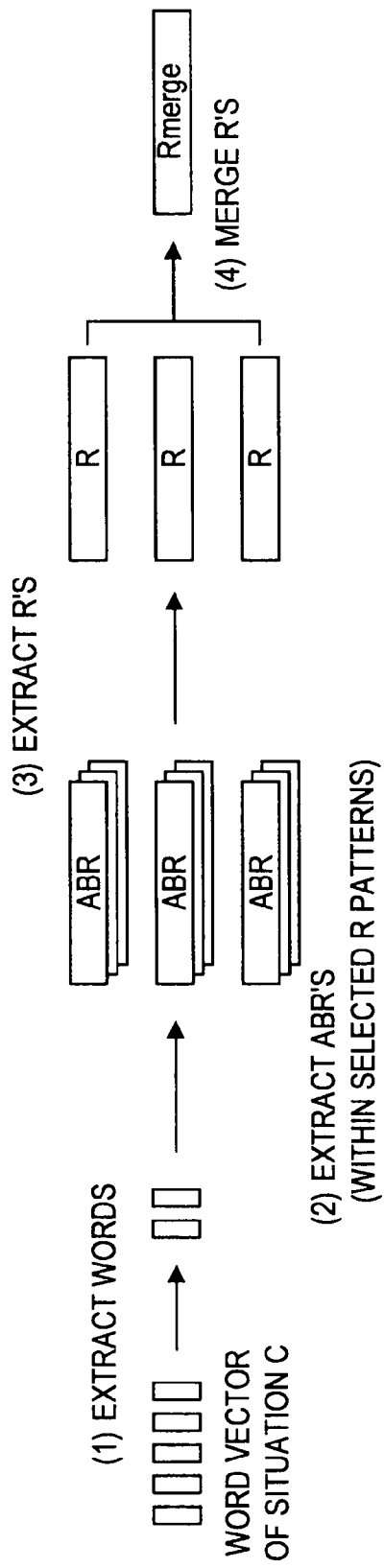
FIG. 28 is an explanatory diagram for describing the recommendation process according to the second embodiment of the present technology.

First, as shown in FIG. 28, the recommendation engine 207 acquires a word vector of a situation C. Then, the recommendation engine 207 extracts a word (two words in this example) from the word vector of the situation C (1). Then, the recommendation engine 207 refers to the case database 206, and extracts sets of a situation A, a result B and a relationship R, where the words (two words in this example) extracted from the word vector of the situation C match the word vector (word A1, word A2) of the situation A (2). Additionally, the sets of a situation A, a result B and a relationship R are extracted from the cases corresponding to the R patterns selected by the user. Next, the recommendation engine 207 extracts word vectors of the relationships R from the extracted sets (3). Then, the recommendation engine 207 merges the word vectors of the relationships R which have been extracted, and creates a merged vector Rmerge (4).

Next, as shown in FIG. 29, the recommendation engine 207 extracts a word (two words in this example) from the word vector of the situation C, and extracts a word (one word in this example) from the merged vector Rmerge (1). Next, the recommendation engine 207 searches for content in which the set of extracted words co-occurs (2). Then, the recommendation engine 207 creates a recommendation list of pieces of content extracted by the search process (3). Additionally, the calculation method of the score to be added to each piece of content is the same as the method described in the first embodiment. Next, the recommendation engine 207 presents the recommendation list created in the above (3) to the user. With these processing steps, the amount of calculation can be reduced.

In the foregoing, the second embodiment of the present technology has been described.

4: Third Embodiment

Next, a third embodiment of the present technology will be described.

[4-1: System Configuration]

Figure 30:
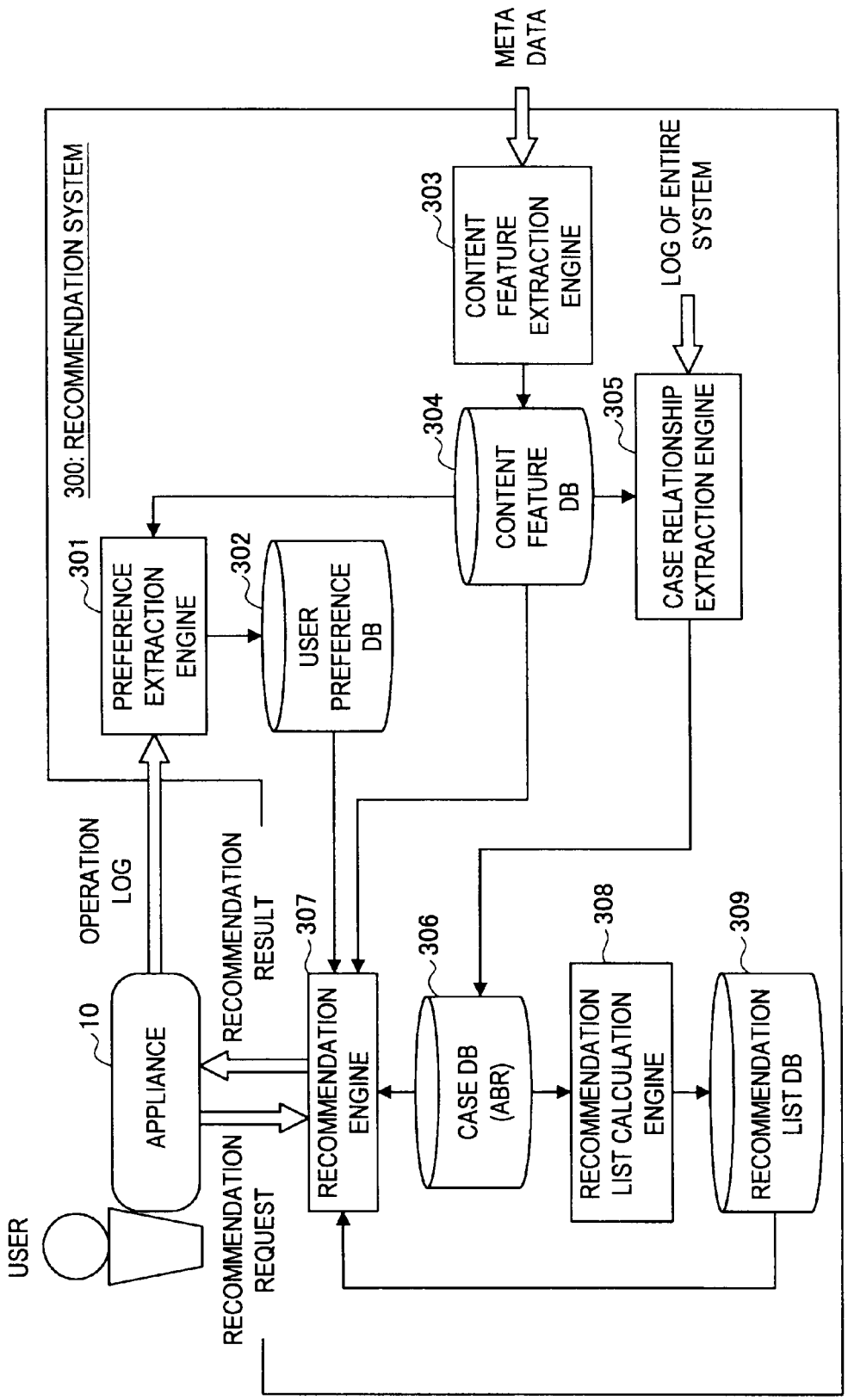
FIG. 30 is an explanatory diagram for describing a configuration of a recommendation system according to a third embodiment of the present technology.

First, a system configuration of a recommendation system 300 according to the present embodiment will be described with reference to FIG. 30. FIG. 30 is an explanatory diagram for describing a system configuration of the recommendation system 300 according to the present embodiment.

As shown in FIG. 30, the recommendation system 300 is mainly configured from a preference extraction engine 301, a user preference database 302, a content feature extraction engine 303, a content feature database 304, a case relationship extraction engine 305, a case database 306, a recommendation engine 307, a recommendation list calculation engine 308 and a recommendation list database 309.

Additionally, the functions of the preference extraction engine 301, the content feature extraction engine 303, the case relationship extraction engine 305, the recommendation engine 307 and the recommendation list calculation engine 308 are realized by the functions of the CPU 902 or the like among the hardware configuration shown in FIG. 38. Also, the user preference database 302, the content feature database 304, the case database 306, and the recommendation list database 309 are realized by the functions of the ROM 904, the RAM 906, the storage unit 920, the removable recording medium 928 and the like among the hardware configuration shown in FIG. 38. Furthermore, the function of the recommendation system 300 may be realized using a single piece of hardware or a plurality of pieces of hardware connected via a network or a leased line.

(Content Feature Extraction Engine 303, Content Feature Database 304)

First, the content feature extraction engine 303 and the content feature database 304 will be described.

The content feature extraction engine 303 is means for structuring the content feature database 304. The content feature extraction engine 303 first acquires metadata of content. Then, the content feature extraction engine 303 identifies each area forming the content by referring to the structure of the acquired metadata, and extracts one or more words characterizing each area based on the TF-IDF value and the like. Furthermore, the content feature extraction engine 303 stores information on the content, information on the area, information on the extracted word and the like in the content feature database 304. Additionally, the structure of the content feature database 304 is substantially the same as the structure of the content feature database 104 shown in FIG. 6. This content feature database 304 is used by the preference extraction engine 301, the case relationship extraction engine 305 and the recommendation engine 307.

(Preference Extraction Engine 301, User Preference Database 302)

Next, the preference extraction engine 301 and the user preference database 302.

When a user inputs information via an appliance 10, the information which is input is input to the preference extraction engine 301. For example, an operation log of the user is input to the preference extraction engine 301. When the operation log of the user is input, the preference extraction engine 301 extracts preference of the user based on the input operation log. Information indicating the preference of the user extracted by the preference extraction engine 301 is stored in the user preference database 302. Additionally, the structure of the user preference database 302 is substantially the same as the structure of the user preference database 102 shown in FIG. 7. This user preference database 302 is used by the recommendation engine 307.

(Case Relationship Extraction Engine 305, Case Database 306)

Next, the case relationship extraction engine 305 and the case database 306 will be described.

The case relationship extraction engine 305 extracts a case relationship based on the information stored in the content feature database 304. Information indicating the case relationship extracted by the case relationship extraction engine 305 is stored in the case database 306. Additionally, the structure of the case database 306 is substantially the same as the structure of the case database 106 shown in FIG. 8. The case database 306 which has been structured is used by the recommendation engine 307 and the recommendation list calculation engine 308.

(Recommendation List Calculation Engine 308, Recommendation List Database 309)

Next, the recommendation list calculation engine 308 and the recommendation list database 309 will be described.

The recommendation list calculation engine 308 creates a recommendation list based on the information stored in the case database 306. Additionally, the creation method of a recommendation list by the recommendation list calculation engine 308 is substantially the same as the creation method of a recommendation list by the recommendation engine 107 according to the first embodiment or the recommendation engine 207 according to the second embodiment. However, unlike the recommendation engines 107 and 207 described above, the recommendation list calculation engine 308 creates a recommendation list in the offline process. Thus, the recommendation list calculation engine 308 uses, as the word vector of a situation C, a preference vector stored in the user preference database 302 or a predetermined word group. A recommendation list created by the recommendation list calculation engine 308 is stored in the recommendation list database 309.

The recommendation list database 309 has a structure as shown in FIG. 31. As shown in FIG. 31, the word vector of a situation C, and the item ID and the score of content included in a recommendation list are included in the recommendation list database 309. This recommendation list database 309 is used by the recommendation engine 307.

(Recommendation Engine 307)

Next, the recommendation engine 307 will be described.

When a recommendation request is received from a user via the appliance 10, the recommendation engine 307 extracts a recommendation list based on the information stored in the user preference database 302, the content feature database 304, the case database 306 and the recommendation list database 309, and presents it to the user as a recommendation result. For example, when the user selects certain content (hereinafter, new content), information on the new content is input to the recommendation engine 307. When he information on the new content is input, the recommendation engine 307 extracts, from a group of pieces of content including the new content, a word vector of the situation C. Then, the recommendation engine 307 extracts a set of words from the word vector of the situation C which has been extracted, and extracts a recommendation list corresponding to the extracted set of words from the recommendation list database 309. Then, the recommendation engine 307 presents the recommendation list extracted from the recommendation list database 309 to the user.

In the foregoing, the system configuration of the recommendation system 300 has been described. Next, a flow of processing performed by the recommendation system 300 will be described in detail.

[4-2: Flow of Offline Process]

An offline process according to the present embodiment is substantially the same as the offline process of the first embodiment up to the creation of the case database 306.

Figure 34:
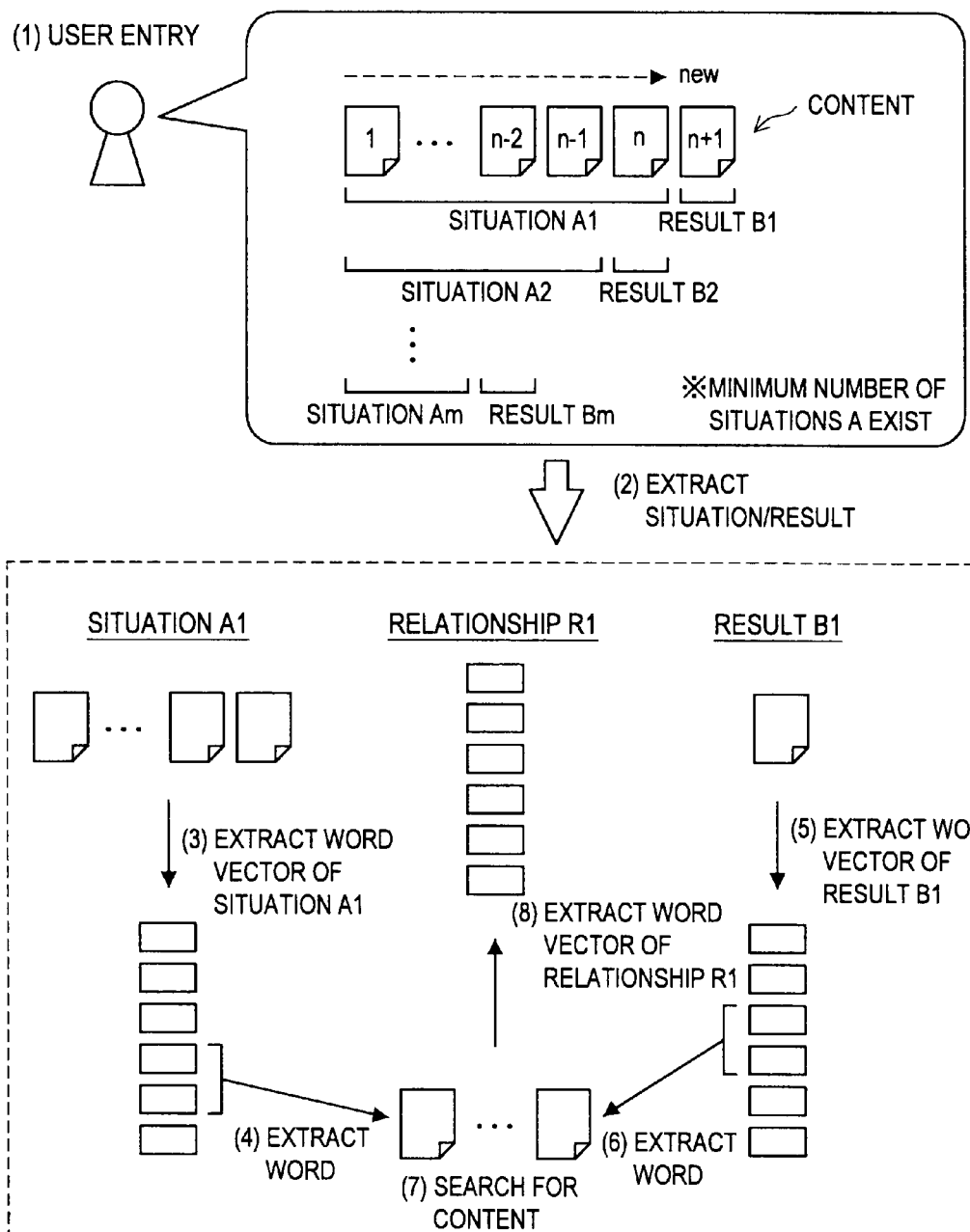
FIG. 34 is an explanatory diagram for describing the offline process according to the third embodiment of the present technology.

First, as shown in FIG. 34 (this example shows a case of j=1), the case relationship extraction engine 305 extracts a word (two words in this example) from a word vector of a situation Aj, and also extracts a word (two words in this example) from a word vector of a result Bj. Next, the case relationship extraction engine 305 searches for content in which the extracted words co-occur. Then, the case relationship extraction engine 305 extracts a word with a high score from an area R of content extracted as the search result and sets the same as the word vector of a relationship Rj. The word vector of the relationship Rj set in this manner is stored in the case database 306.

Figure 32:
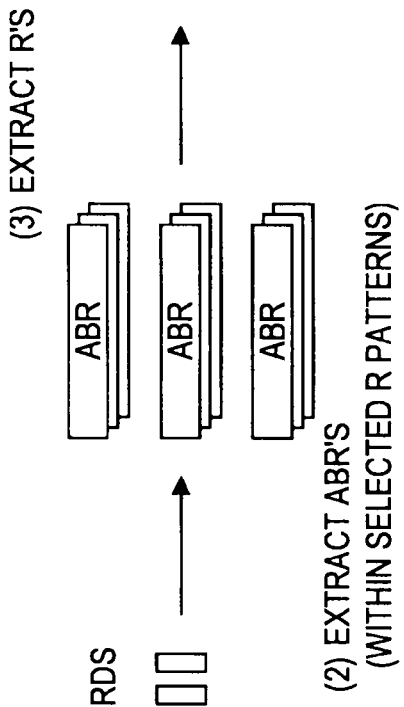
FIG. 32 is an explanatory diagram for describing an offline process (score calculation for relationship R) according to the third embodiment of the present technology.

The difference between the offline process of the present embodiment and the offline process of the first embodiment is that a recommendation list is created in advance in the offline process and is held in the recommendation list database 309. As shown in FIG. 32, first, the recommendation list calculation engine 308 extracts a word (two words in this example) from a preference vector or a predetermined word group (hereinafter, an entire word list C') stored in the user preference database 302 (1). Then, the recommendation list calculation engine 308 extracts cases where the set of extracted words and the word vector of a situation A match each other (2). Next, the recommendation list calculation engine 308 extracts word vectors of the relationships R from the extracted cases (3). Then, the recommendation list calculation engine 308 merges the word vectors of relationships R which have been extracted, and creates a merged vector Rmerge (4).

Next, as shown in FIG. 33, the recommendation list calculation engine 308 extracts a word (two words in this example) from the entire word list C', and also extracts a word (one word in this example) from the merged vector Rmerge (1). Then, the recommendation list calculation engine 308 searches for content including, in an area C, the word extracted from the entire word list C' and including, in an area R, the word extracted from the word vector of the merged vector Rmerge (2). Then, the recommendation list calculation engine 308 calculates the score of each piece of content extracted by the search process, and creates a recommendation list (3).

Additionally, there are a large number of combinations of words extracted in (1) described above. Thus, the recommendation list calculation engine 308 repeatedly performs the search process of (2) described above and the creation process of a recommendation list of (3) described above for this large number of combinations. The recommendation lists created in this manner are stored in the recommendation list database 309.

In the foregoing, the flow of the offline process has been described.

[4-3: Flow of Online Process]

Figure 35:
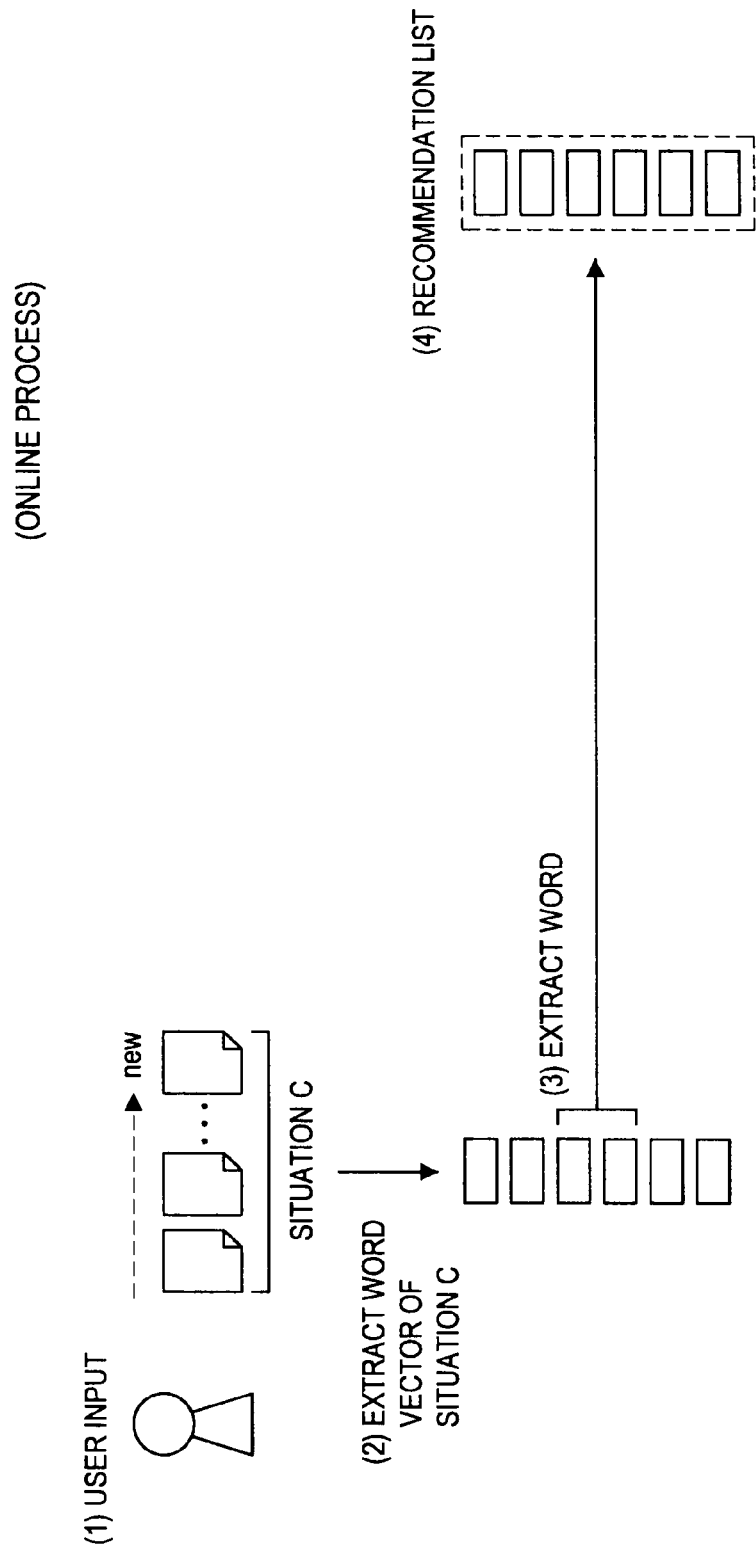
FIG. 35 is an explanatory diagram for describing an online process according to the third embodiment of the present technology.
Figure 36:
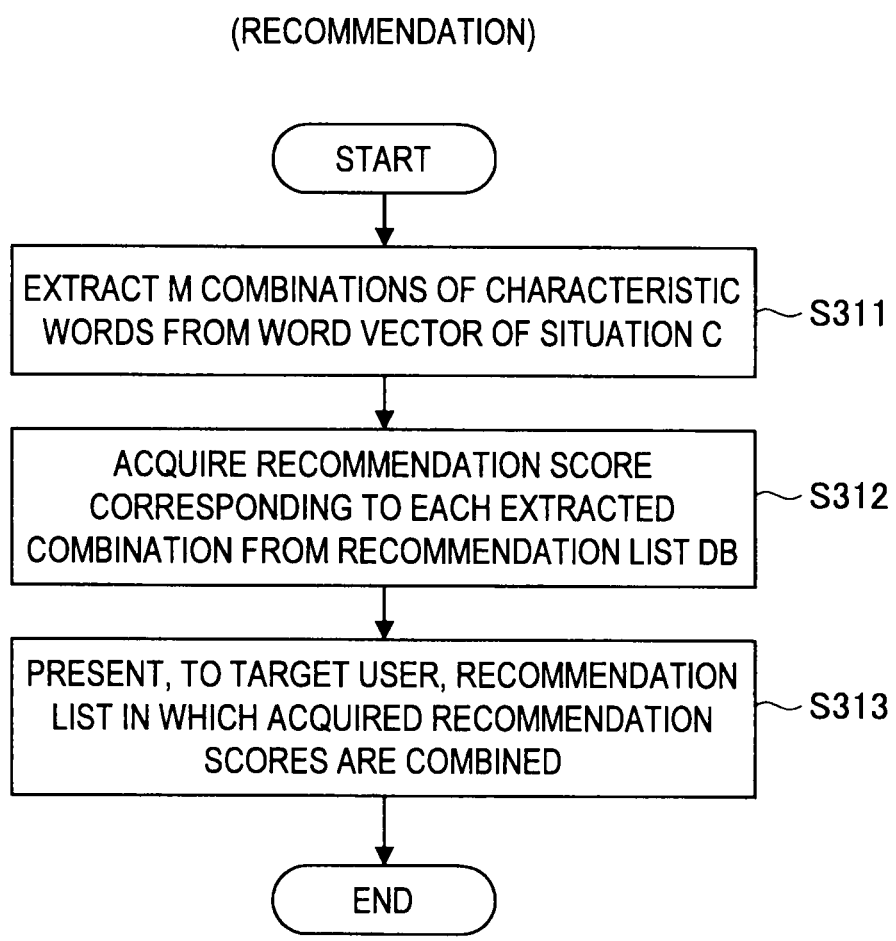
FIG. 36 is an explanatory diagram for describing the online process according to the third embodiment of the present technology.

Next, a flow of an online process, among processes performed by the recommendation system 300, will be described with reference to FIGS. 35 and 36. FIGS. 35 and 36 are explanatory diagrams for describing an online process among processes performed by the recommendation system 300.

(Overview of Online Process)

First, FIG. 35 will be referred to. An online process is performed when a recommendation request is received. When new content is selected by a user ((1) user input), the recommendation engine 307 extracts a word vector of a situation C (2). At this time, the recommendation engine 307 first extracts a preference vector from the user preference database 302, and updates the preference vector by using a word characterizing an area C of the new content. Then, the recommendation engine 307 sets the updated preference vector as the word vector of the situation C.

Next, the recommendation engine 307 extracts a word (two words in this example) from the word vector of the situation C (3). Then, the recommendation engine 307 refers to the recommendation list database 309, extracts pieces of content and scores corresponding to the same word vector as the set of extracted words, and creates a recommendation list by combining these pieces of content and scores (4). There are a large number of combinations of a word extracted from the word vector of the situation C and a word extracted from the word vector of the relationship R. Thus, the creation process of a recommendation list is repeatedly performed for different combinations, and a plurality of recommended lists are created. The recommendation engine 307 integrates the plurality of recommended lists, and presents the same as a recommendation result to the user.

(Flow of Online Process)

The flow of the online process which has been described with reference to FIG. 35 can be summarized as the flow chart as shown in FIG. 36. As shown in FIG. 36, the recommendation engine 307 extracts combinations of words (two words in this example) from the word vector of a situation C (S311). Then, the recommendation engine 307 acquires from the recommendation list database 309 a recommendation score corresponding to each combination extracted in step S311 (S312). Then, the recommendation engine 307 creates a recommendation list in which the recommendation score and content acquired in step S312 are combined and presents it to the user (S313), and ends the series of processes. In this manner, by creating the recommendation list in advance in the offline process, the online process is greatly simplified.

In the foregoing, the third embodiment of the present technology has been described.

5: Example Application

Cross-Category Recommendation

Figure 37:
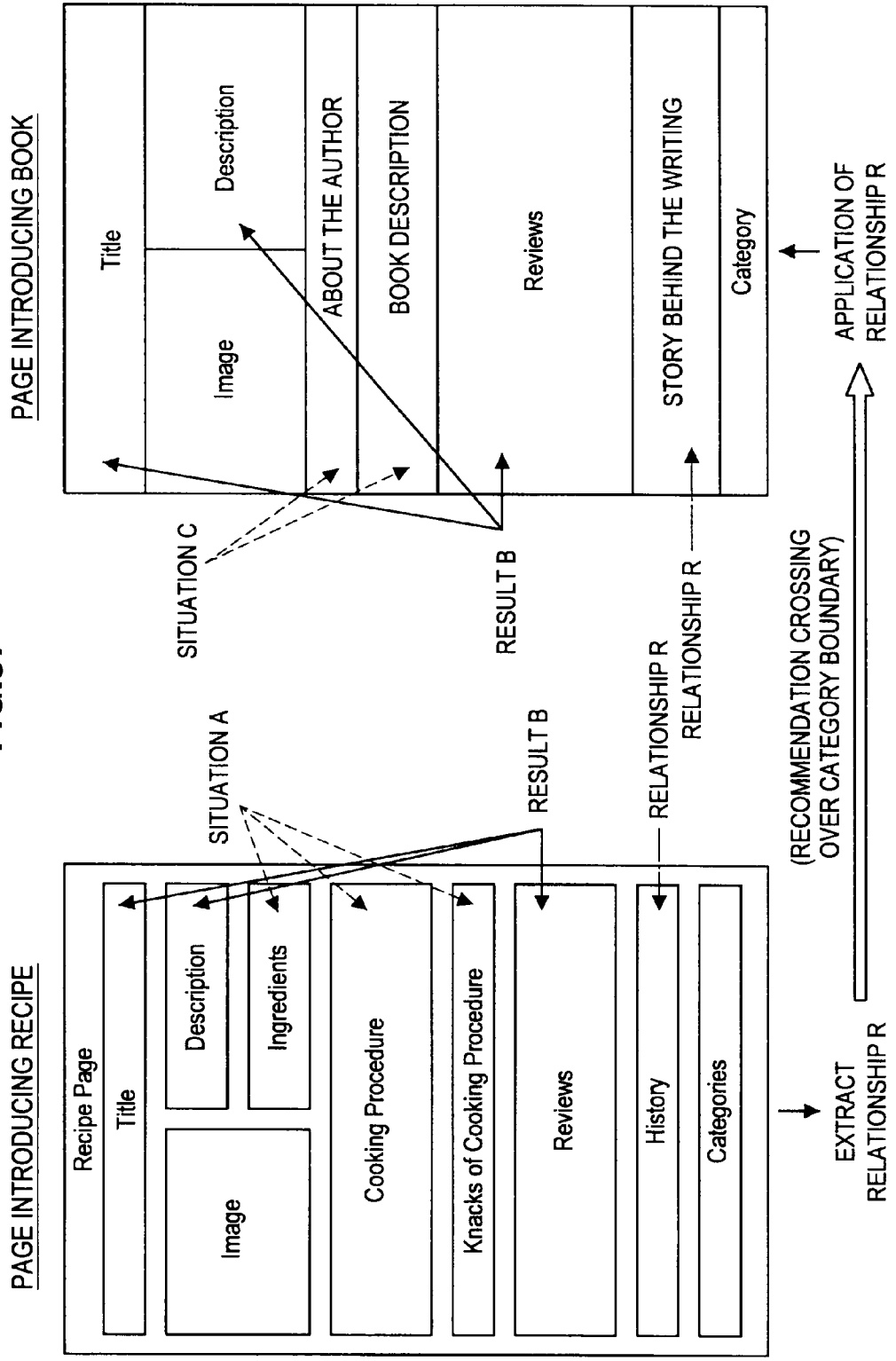
FIG. 37 is an explanatory diagram for describing an example application (cross-category recommendation) of the technologies according to the first to third embodiments of the present technology.

Here, as an example application of the first to third embodiments described above, application to cross-category recommendation will be described. The cross-category recommendation means recommending content based on structure mapping crossing over category boundaries. As shown in FIG. 37, as an example of the cross-category recommendation, there is an example of extracting a relationship R between a situation A and a result B from a page introducing recipes and recommending, by using the relationship R and a situation C, a page introducing books matching the preference of the user. The page introducing recipes and the page introducing books are pieces of content belonging to different categories. However, by applying the technologies of the first to third embodiments described above, recommendation crossing over category boundaries as described can be realized.

6: Example Hardware Configuration

The function of each structural element of the recommendation systems 100, 200 and 300 described above can be realized by using, for example, the hardware configuration of the information processing apparatus shown in FIG. 38. That is, the function of each structural element can be realized by controlling the hardware shown in FIG. 38 using a computer program. Additionally, the mode of this hardware is arbitrary, and may be a personal computer, a mobile information terminal such as a mobile phone, a PHS or a PDA, a game console, or various types of information appliances. Moreover, the PHS is an abbreviation for Personal Handy-phone System. Also, the PDA is an abbreviation for Personal Digital Assistant.

As shown in FIG. 38, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus.

Also, the SCSI is an abbreviation for Small Computer System Interface.

The communication unit 926 is a communication device to be connected to a network 932, and is, for example, a communication card for a wired or wireless LAN, Bluetooth (registered trademark) or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

7. Summary

Lastly, the technical ideas of the present embodiment will be briefly described. The technical ideas stated here can be applied to various information processing apparatuses, such as a PC, a mobile phone, a portable game console, a portable information terminal, an information appliance, a car navigation system and the like. Also, a part or all of the functions of the information processing apparatus described below can be realized by an information processing system such as a cloud system or the like.

The functional configuration of the information processing apparatus mentioned above can be expressed as follows. The information processing apparatus includes a first feature generation unit, a second feature generation unit, a relational feature generation unit and a recommended content search unit described below. The first feature generation unit mentioned above is means for generating a first feature based on information of a first type included in first content selected by a target user in the past. Also, the second feature generation unit mentioned above is means for generating a second feature based on information of a second type included in second content selected by the target user after selecting the first content.

For example, the first feature generation unit described above recognizes, for each of pieces of content $X1, \ldots, Xn$ selected by the target user in the past, based on the metadata of the pieces of content $X1, \ldots, Xn$, one or more information areas set in advance to which metadata of the first type is added. Then, the first feature generation unit described above extracts a predetermined number of characteristic information units (for example, words or the like) from the recognized information area, and creates a feature vector (hereinafter, a first feature vector) having the information units as the elements. Additionally, the pieces of content $X1, \ldots, Xn$ are assumed to have been selected in the order of $X1, \ldots, Xn$. On the other hand, the second feature generation unit described above focuses on content Y selected after the content Xn, which was selected last by the target user.

First, the second feature generation unit described above recognizes, based on the metadata of the content Y, one or more information areas set in advance to which metadata of a second type is added. Then, the second feature generation unit described above extracts a predetermined number of characteristic information units (for example, words or the like) from the recognized information area, and creates a feature vector (hereinafter, a second feature vector) having the information units as the elements. The content Y in this example is selected under a pre-condition (hereinafter, a situation A) that the target user has selected the pieces of content $X1, \ldots, Xn$ in the past. That is, the first feature vector mentioned above characterizes the situation A of the target user, and the second feature vector mentioned above characterizes the result (hereinafter, a result B) of the situation A.

Now, the relational feature generation unit is means for generating a relational feature showing the relationship between the first content and the second content, based on the first feature generated by the first feature generation unit and the second feature generated by the second feature generation unit. When using the expression of the above example, the relational feature generation unit described above is means for generating a relational feature showing the relationship between the situation A and the result B by using the first feature vector and the second feature vector.

For example, the relational feature generation unit described above searches for content in which a predetermined number of information elements extracted from the first feature vector and a predetermined number of information elements extracted from the second feature vector co-occur. Then, the relational feature generation unit described above extracts a predetermined number of characteristic information units (for example, words or the like) from content which has been detected, and creates a feature vector (hereinafter, a relational feature vector) having the information units as the elements. Here, the relational feature generation unit described above may be configured to extract the information unit from a predetermined information area. In this case, the relational feature generation unit described above refers to the metadata added to content, and selects an information area to be used for extraction of the information unit. Additionally, the relational feature vector described above is for characterizing the relationship (hereinafter, a relationship R) between the situation A and the result B.

Now, the recommended content search unit mentioned above is means for searching for content to be recommended to the target user by using the information of the first type included in content newly selected by the target user and the relational feature generated by the relational feature generation unit. When using the expression of the above example, the recommended content search unit described above is means for searching, when a new situation C corresponding to the situation A described above is given, for content to be recommended to the target user by using the situation C and the relationship R. It should be noted here that the recommended content search unit described above is not means for obtaining a result X corresponding to the situation C by using the relationship R.

As described above, by calculating the relationship R between the situation A and the result B based on the history of the target user and searching for content to be recommended by using the relationship R, content including new information that suits the preference of the target user can be obtained.

(Notes)

The recommendation systems 100, 200 and 300 are examples of a content recommendation device. The case relationship extraction engines 105, 205 and 305 are examples of a first feature generation unit, a second feature generation unit and a relational feature generation unit. The recommendation engines 107, 207 and 307 are examples of a recommended content search unit. The R pattern extraction engine 208 is an example of a relational feature generation unit. The recommendation engine 207 is an example of a relationship selection request unit. The case databases 106, 206 and 306 are examples of a feature storage unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-072324 filed in the Japan Patent Office on Mar. 29, 2011, the entire content of which is hereby incorporated by reference.

What is claimed is:

1. A content recommendation device, comprising:
a first feature generation unit configured to generate a first feature based on information of a first type included in first content selected from content pieces by a target user in past;
a second feature generation unit configured to generate a second feature based on information of a second type included in a current search request by the target user;
a relational feature generation unit configured to generate a plurality of relational features that indicate a relationship between the first content and the current search request, based on the first feature and the second feature;
a recommended content search unit configured to:
output the plurality of relational features to the target user;
receive a user input corresponding to selection of one of the plurality of relational features; and
search for a first set of content pieces based on the information of the first type included in third content that is newly selected by the target user, the selected one of the plurality of relational features, and a clustering of words based on a word vector associated with the relationship between the first content and the current search request,
wherein content to be recommended to the target user is selected from the first set of content pieces, wherein the third content is different from the first content; and
a display device configured to present the content to be recommended to the target user.

2. The content recommendation device according to claim 1, wherein the recommended content search unit is further configured to search for the first set of content pieces based on:
a first process of extraction of the first feature that corresponds to the information of the first type, included in the third content newly selected by the target user, from a plurality of first features generated by the first feature generation unit, and
a second process of extraction of one of the plurality of relational features that corresponds to the first feature extracted by the first process.

3. The content recommendation device according to claim 1,
wherein the first feature is a first feature vector that includes a first plurality of information elements that correspond to the information of the first type and that characterizes the first content, and
wherein the second feature is a second feature vector that includes a second plurality of information elements that correspond to the information of the second type and that characterizes the current search request.

4. The content recommendation device according to claim 1,
wherein the first feature generation unit is further configured to acquire, based on a structure of first metadata of the first content, the information of the first type from a first area to which the first metadata that corresponds to the first type is added, and
wherein the second feature generation unit is further configured to acquire, based on a structure of second metadata of the current search request, the information of the second type from a second area to which the second metadata that corresponds to the second type is added.

5. The content recommendation device according to claim 1,
wherein the recommended content search unit is further configured to search for the first set of content pieces based on a calculation of a score, and
wherein the score is calculated based on a strength of the relationship between the first content and the current search request.

6. The content recommendation device according to claim 1,
wherein the first feature generation unit is further configured to generate the first feature before the target user newly selects the third content,
wherein the second feature generation unit is further configured to generate the second feature before the target user newly selects the third content, and wherein the relational feature generation unit is further configured to generate one of the plurality of relational features before the target user newly selects the third content.

7. The content recommendation device according to claim 1, wherein, before the target user newly selects the third content, the recommended content search unit is further configured to:
   extract the first feature that corresponds to a particular information that corresponds to the information of the first type,
   extract one of the relational feature that corresponds to the extracted first feature, from the plurality of relational features, and
   calculate a score of the extracted relational feature, and
   wherein, based on new selection of the third content by the target user, the recommended content search unit is further configured to:
      extract the particular information that corresponds to the information of the first type included in the third content that is newly selected by the target user, and
      search for the first set of content pieces, based on the calculated score of the extracted relational feature.

8. The content recommendation device according to claim 1, wherein a first category to which the first content and the current search request belong and a second category to which the third content newly selected by the target user belongs are different categories.

9. The content recommendation device according to claim 1, wherein the first content is selected in an order that starts from an oldest of the content pieces, and wherein the current search request is a newest of the content pieces.

10. The content recommendation device according to claim 1,
   wherein the plurality of relational features corresponds to a relationship between each case and each cluster, and
   wherein each case indicates an association between the first content, the current search request and the selected one of the plurality of relational features.

11. A content recommendation device, comprising:
   a feature storage unit configured to store:
      a first feature generated based on information of a first type included in first content selected from content pieces by a target user in past,
      a second feature generated based on information of a second type included in a current search request by the target user, and
      a plurality of relational features, generated based on the first feature and the second feature, which indicate a relationship between the first content and the current search request;
   a recommended content search unit configured to:
      output the plurality of relational features to the target user;
      receive a user input corresponding to selection of one of the plurality of relational features; and
      search for a first set of content pieces based on the information of the first type included in third content that is newly selected by the target user, the selected one of the plurality of relational features, and a clustering of words based on a word vector associated with the relationship between the first content and the current search request,
   wherein content to be recommended to the target user is selected from the first set of content pieces, wherein the third content is different from the first content; and
   a display device configured to present the content to be recommended to the target user.

12. A recommended content search method, comprising:
   generating a first feature based on information of a first type included in first content selected from content pieces by a target user in past;
   generating a second feature based on information of a second type included in a current search request by the target user;
   generating a plurality of relational features indicating a relationship between the first content and the current search request second content, based on the first feature and the second feature;
   outputting the plurality of features to the target user;
   receiving a user input corresponding to selection of one of the plurality of relational features;
   searching a first set of content pieces based on the information of the first type included in third content that is newly selected by the target user, the selected one of the plurality of relational features, and a clustering of words based on a word vector associated with the relationship between the first content and the current search request,
   wherein content to be recommended to the target user is selected from the first set of content pieces, wherein the third content is different from the first content; and
   displaying, on a display device, the content to be recommended to the target user.

13. A non-transitory computer-readable medium having stored thereon computer-executable instructions, which when executed by a computer, cause the computer to execute operations, the operations comprising:
   generating a first feature based on information of a first type included in first content selected from content pieces by a target user in past;
   generating a second feature based on information of a second type included in a current search request by the target user;
   generating a plurality of relational features indicating a relationship between the first content and the current search request second content, based on the first feature and the second feature;
   outputting the plurality of relational features to the target user;
   receiving a user input corresponding to selection of one of the plurality of relational features;
   searching for a first set of content pieces based on the information of the first type included in third content newly selected by the target user, the selected one of the plurality of relational features, and a clustering of words based on a word vector associated with the relationship between the first content and the current search request,
   wherein content to be recommended to the target user is selected from the first set of content pieces, wherein the third content is different from the first content; and
   displaying the content to be recommended to the target user.

* * * * *